(12) United States Patent
Iida et al.

(10) Patent No.: US 6,974,267 B2
(45) Date of Patent: Dec. 13, 2005

(54) RECORDING MATERIAL PROCESSING APPARATUS FOR PROCESSING RECORDING MATERIAL

(75) Inventors: Takayuki Iida, Kanagawa (JP); Yoshio Ozawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/812,072

(22) Filed: Mar. 30, 2004

(65) Prior Publication Data

US 2004/0190895 A1 Sep. 30, 2004

(30) Foreign Application Priority Data

Mar. 31, 2003 (JP) .............................. 2003-096483
Mar. 31, 2003 (JP) .............................. 2003-096484
Mar. 31, 2003 (JP) .............................. 2003-097010

(51) Int. Cl.$^7$ ............................ G03D 3/02; G03D 3/08
(52) U.S. Cl. ...................... 396/567; 396/612; 396/616; 396/617; 396/620; 355/27; 355/29
(58) Field of Search ................................ 396/567–570, 396/578, 612, 616–620, 626; 355/27–29, 355/77

(56) References Cited

U.S. PATENT DOCUMENTS

| 4,872,033 A | * | 10/1989 | Watanabe et al. ............. 355/27 |
| 5,765,070 A | * | 6/1998 | Matsumoto ................. 396/615 |
| 2003/0152382 A1 | | 8/2003 | Maruhashi et al. |

FOREIGN PATENT DOCUMENTS

| JP | 6-214368 A | 8/1994 |
| JP | 8-286347 A | 11/1996 |

* cited by examiner

Primary Examiner—D. Rutledge
(74) Attorney, Agent, or Firm—Sughrue Mion, PLLC

(57) ABSTRACT

A photographic paper processor includes plural serially arranged liquid baths, for sequentially processing a first photographic paper sheet of one type. The plural liquid baths are constituted by bath groups G1 and G2. The bath group G1 includes a color developing bath. The bath group G2 is positioned downstream from the bath group G1, and includes rinsing baths. First and second motors are operable individually, and rotate to transport the first paper sheet through respectively the bath groups G1 and G2 at a speed V1. A controller sets the bath group G1 at a speed V2 according to information of a second photographic paper sheet of a different type for processing next to the first paper sheet. Subsequently, the bath group G2 is set at the speed V2, to transport the second paper sheet through the plural liquid baths at the speed V2.

10 Claims, 15 Drawing Sheets

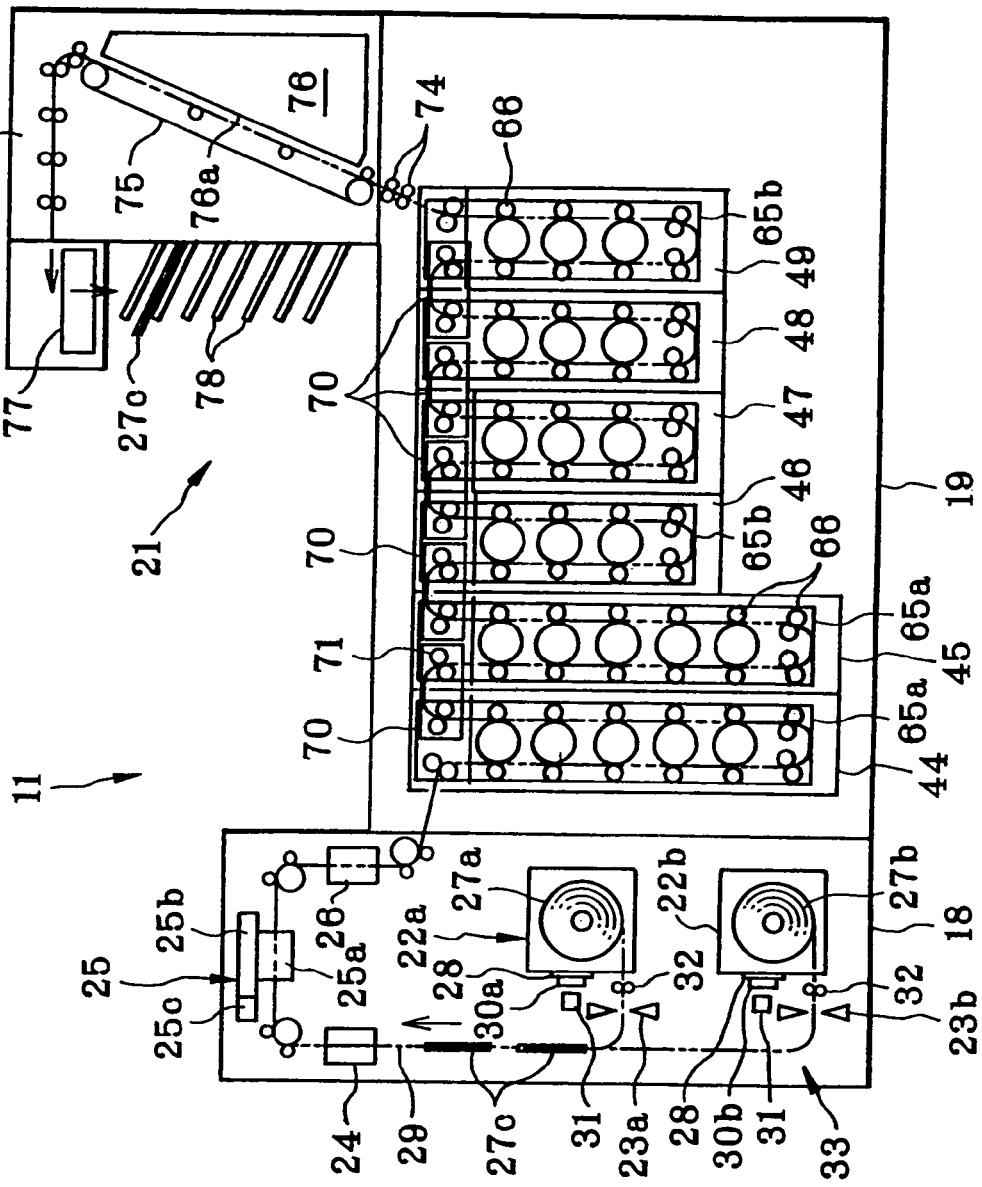
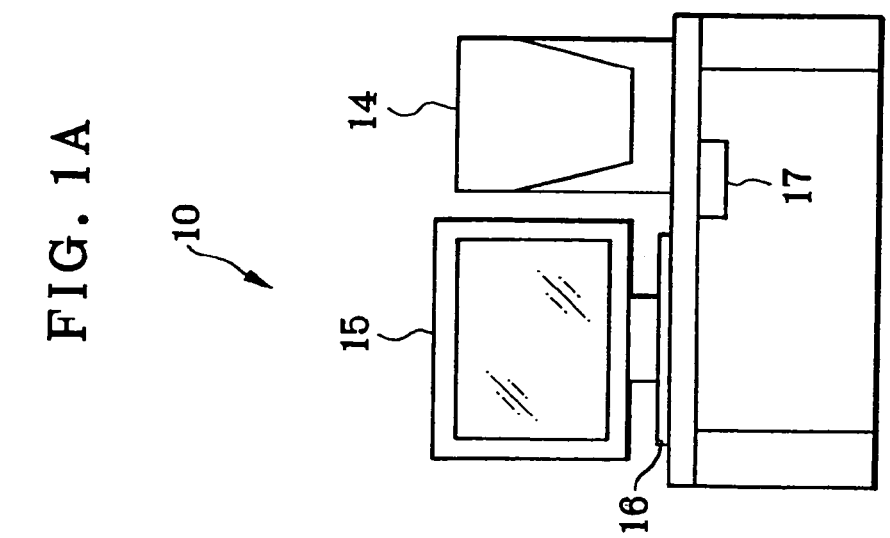
FIG. 1A
FIG. 1B

FIG. 3

| PAPER TYPES | | A | B | C |
|---|---|---|---|---|
| PRINTER SECTION | DRAWING SPEED | Vpm1 | Vpm2 | Vpm3 |
| | INTERVAL OF CUTTING | P1 | P2 | P3 |
| | EXISTENCE OF BACK PRINTING | YES | YES | NO |
| | EXPOSING SPEED | Ve1 | Ve2 | Ve3 |
| | SORTING SPEED | Vf1 | Vf2 | Vf3 |
| | TRANSPORTING SPEED | Vr1 | Vr2 | Vr3 |
| PROCESSOR SECTION | TRANSPORTING SPEED | Vp1 | Vp2 | Vp3 |
| | LIQUID TEMPERATURE | Tp1 | Tp2 | Tp3 |
| | REPLENISHER FLOW RATE | Qp1 | Qp2 | Qp3 |
| DRIER SECTION | TRANSPORTING SPEED | Vd1 | Vd2 | Vd3 |
| | DRYING TEMPERATURE | Td1 | Td2 | Td3 |
| | AIR FLOW RATE | Qd1 | Qd2 | Qd3 |
| STACKER SECTION | TRANSPORTING SPEED | Vs1 | Vs2 | Vs3 |
| | REALIGNING SPEED | Vm1 | Vm2 | Vm3 |
| | TRAY MOVING SPEED | Vb1 | Vb2 | Vb3 |

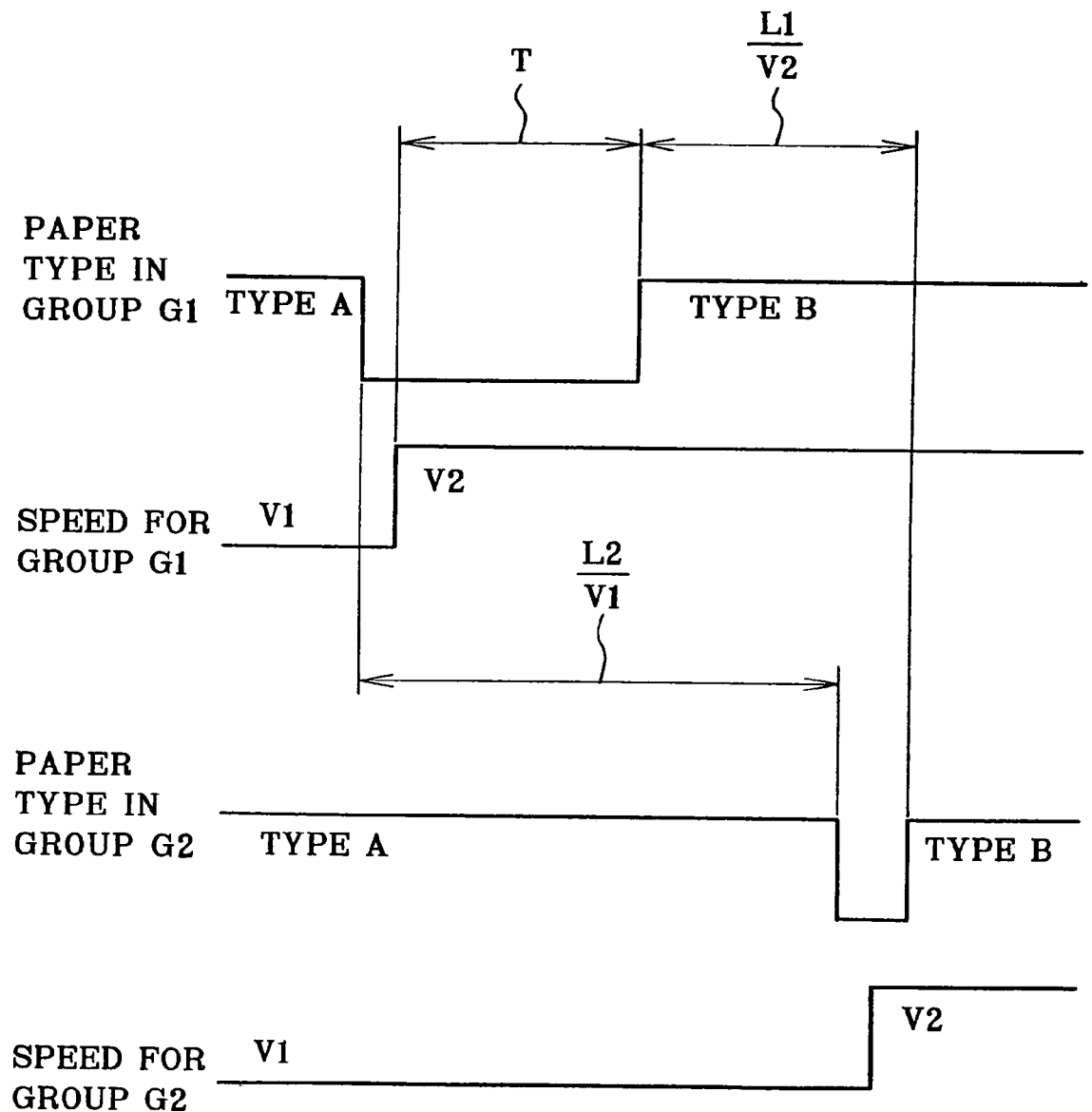

RECORDING MATERIAL PROCESSING APPARATUS FOR PROCESSING RECORDING MATERIAL

BACKGROUND OF THE INVENTION

1. Field of the Invention

The present invention relates to a recording material processing apparatus. More particularly, the present invention relates to a recording material processing apparatus in which, even when a change in the type of the recording material is desired, two or more types of recording material can be handled efficiently in a consecutive manner.

2. Description Related to the Prior Art

A photographic paper processor is known as a recording material processing apparatus, and is used in a photo laboratory for producing photo prints from exposed photo films. If the paper processor is a printer/processor as a combined output machine, the paper processor includes a printer section, and also a processor section, a drier section and a stacker section. The printer section exposes an image of exposed photo film to photographic paper as photosensitive material or recording material. The processor section subjects the photographic paper to photographic processing. The stacker section is added if desired, and stacks photo prints. The processor section includes a number of transporting rollers and a train of liquid baths. The transporting rollers transport the photographic paper being exposed. The liquid baths contain liquids for color development, bleach/fixing, rinsing and stabilization. The transporting rollers transport the photographic paper into the liquid baths, where the photographic paper is moved through the liquids sequentially for photographic processing. For the paper processor, the type of the photographic paper to be used is previously found adaptable. The liquids in the paper processor for the photographic paper are also predetermined. A color developing bath is included in the liquid baths. In the color developing bath, liquid temperature and process time, that is a transporting speed, are previously determined according to a processing condition depending on a characteristic of developing liquid.

There are various kinds of the photographic paper different in the characteristic according to differences of manufacturers or material type. It is necessary to change processing conditions of the paper processor by considering the characteristic of the photographic paper for the purpose of optimizing quality of images recorded to the photographic paper of such various kinds. If the paper processor of a single machine is used for consecutively treating the kinds of the photographic paper, changing over of the setting should be effected efficiently for rapid operation.

Among the various known techniques, JP-A 8-286347 discloses a control of flow of the liquids at the time of a change of a processing condition, to impart a new flow rate to the liquids for the purpose of coping with a difference in the types. JP-A 6-214368 discloses the use of plural types of the developing liquid different in the characteristic. The color developing bath contain the developing liquid, and are selectively connected for specifically designated type of the photographic paper.

If plural types of the photographic paper is desired for successive handling in the paper processor, there are difficulties, because the transporting speed must be changed for entry of a second type of the photographic paper after exiting of a first type from the liquid baths. Between the consecutive steps of processing in the course of the operation, the transporting speed of the photographic paper and other conditions must be changed for the second type. If the required transporting speed differs considerably, no efficient printing can be effected. According to JP-A 6-214368 in which the liquid baths are selectable for the type of the photographic paper, problems of large sizes are likely to arise, because of a higher number of types of the liquid baths, and a changeable structure for the transporting paths. A manufacturing cost of the paper processor will be very high.

SUMMARY OF THE INVENTION

In view of the foregoing problems, an object of the present invention is to provide a recording material processing apparatus in which, even when a change in the type of the recording material is desired, two or more types of recording material can be handled efficiently in a consecutive manner.

In order to achieve the above and other objects and advantages of this invention, a recording material processing apparatus includes plural liquid baths, arranged along a transporting path, for sequentially processing a first recording material being transported. In the recording material processing apparatus, the plural liquid baths are constituted by at least first and second bath groups, the second bath group being positioned downstream from the first bath group with respect to the transporting path. First and second transporting mechanisms are operable individually from each other, for transporting the first recording material through respectively the first and second bath groups at a speed V1. A controller sets the first transporting mechanism at a speed V2 according to material information of a second recording material for processing next to the first recording material, and subsequently sets the second transporting mechanism at the speed V2, so as to transport the second recording material through the plural liquid baths at the speed V2.

The first and second recording materials are photosensitive, the plural liquid baths have a color developing bath which is included in the first bath group.

Furthermore, an advancing mechanism supplies the first bath group with the first recording material. The controller causes the first transporting mechanism to exit the first recording material from the first bath group, then sets the first transporting mechanism at the speed V2, and then causes the advancing mechanism to supply the first bath group with the second recording material. The controller causes the second transporting mechanism to exit the first recording material from the second bath group, and then sets the second transporting mechanism at the speed V2, thereafter the second recording material entering the second bath group.

Furthermore, a memory stores a data table including material information of the first and second recording materials, and information of the speeds V1 and V2 associated therewith. The controller estimates time of exiting of the first recording material from the first bath group according to the speed V1 and a path length L1 of a path of the first bath group, and estimates time of exiting of the first recording material from the second bath group according to the speed V1 and a path length L2 of a path of the second bath group.

The controller compares the speed V1 with the speed V2, and if V2>V1, then waits for lapse of delay time T after setting of the first transporting mechanism at the speed V2 before supplying the first bath group with the second recording material, where the delay time T is so long as to set entry of the second recording material to the second bath group simultaneously with or later than exiting of the first recording material from the second bath group, to prevent jam.

Furthermore, first and second passage sensors are disposed at a downstream end of respectively the first and second bath groups, for detecting a rear end of the first recording material, to check exiting thereof.

The delay time T satisfies a condition of:

$$T = L2/V1 - L1/V2.$$

The first bath group further includes a bleach/fixing bath positioned downstream from the color developing bath, and the second bath group includes at least one rinsing bath.

In one preferred embodiment, the second bath group includes a bleach/fixing bath.

If $V2 \leq V1$, then the controller causes the advancing mechanism to supply the first bath group with the second recording material directly after exiting the first recording material from the first bath group.

The first and second recording materials comprise recording sheets.

Furthermore, a drier section is disposed downstream from the second bath group with respect to the transporting path, for drying the first recording material. A drier-path transporting mechanism is operable individually from the first and second transporting mechanisms, for transporting the first recording material in the drier section at the speed V1.

The at least first and second bath groups comprise at least first, second and third bath groups, and the first and second transporting mechanisms comprise at least first, second and third transporting mechanisms.

In one aspect of the invention, a recording material processing method is provided, in which plural liquid baths arranged along a transporting path successively process a first recording material being transported. In the recording material processing method, the first recording material is transported through the plural liquid baths at a speed V1. The plural liquid baths are constituted by at least first and second bath groups, the second bath group being positioned downstream from the first bath group with respect to the transporting path. The first bath group is changed over to a speed V2 adapted to a second recording material for processing next to the first recording material. After changing over the first bath group to the speed V2, the second bath group is changed over to the speed V2. The plural liquid baths are supplied with the second recording material, to transport the second recording material at the speed V2.

The first and second recording materials are photosensitive, the plural liquid baths have a color developing bath which is included in the first bath group.

The first recording material is exited from the first bath group, and subsequently the first bath group is set at the speed V2, and the second recording material is supplied to the first bath group after the first bath group is set at the speed V2. The first recording material is exited from the second bath group, and subsequently the second bath group is set at the speed V2, the second recording material entering the second bath group after the second bath group is set at the speed V2.

In another aspect of the invention, a recording material processing apparatus includes a liquid bath for sequentially processing a first recording material being transported. A drier section is positioned downstream from the liquid bath with respect to a transporting path. First and second transporting mechanisms are operable individually from each other, for transporting the first recording material through respectively the liquid bath and the drier section at a transporting quantity Q1. A controller sets the first transporting mechanism at a transporting quantity Q2 according to material information of a second recording material for processing next to the first recording material, and subsequently sets the second transporting mechanism at the transporting quantity Q2, so as to transport the second recording material through the liquid bath and the drier section at the transporting quantity Q2.

If a drying speed of the second recording material is lower than a drying speed of the first recording material, the transporting quantity Q2 is determined smaller than the transporting quantity Q1, and is obtained by low-speed movement or intermittent movement of the second transporting mechanism.

Furthermore, an advancing mechanism supplies the liquid bath with the first and second recording materials. If a drying speed of the second recording material is higher than a drying speed of the first recording material, the transporting quantity Q2 is determined greater than the transporting quantity Q1. The controller controls the advancing mechanism in response to the material information, to supply the liquid bath with the second recording material with delay in order to keep the transporting quantity Q1 smaller than the transporting quantity Q2.

Furthermore, a motor drives the first and second transporting mechanisms. A changeover mechanism is secured between the second transporting mechanism and the motor, responsive to the material information, for changing over a connected state between the second transporting mechanism and the motor.

The changeover mechanism comprises a clutch mechanism, responsive to the material information, for disconnecting the second transporting mechanism from the motor.

In one preferred embodiment, furthermore, first and second motors drive respectively the first and second transporting mechanisms.

In a further aspect of the invention, a recording material processing apparatus includes first to Nth liquid baths, disposed along a transporting path, for sequentially processing a first recording material being transported. First to Nth transporting mechanisms are operable individually from each other, for transporting the first recording material through respectively the first to Nth liquid baths at a transporting quantity Q1. A controller sets the first to Nth transporting mechanisms at a transporting quantity Q2 according to material information of a second recording material for processing next to the first recording material, in a sequence from the first transporting mechanism to the Nth transporting mechanism, so as to transport the second recording material through the first to Nth liquid baths at the transporting quantity Q2.

Furthermore, an advancing mechanism supplies the first liquid bath with the first recording material. First and second passage sensors are disposed at a downstream end of respectively the first to Nth liquid baths, for detecting a rear end of the first recording material, to output first to Nth passage information. In response to Kth passage information of the first to (N−1)th passage information, the controller sets a Kth transporting mechanism of the first to (N−1)th transporting mechanisms at the transporting quantity Q2, and subsequently causes the advancing mechanism or the (K−1)th transporting mechanism to supply a Kth liquid bath of the first to (N−1)th liquid baths with the second recording material, and in response to said (K+1)th passage information, the controller sets the (K+1)th transporting mechanism at the transporting quantity Q2, thereafter the second recording material entering the (K+1)th liquid bath.

BRIEF DESCRIPTION OF THE DRAWINGS

The above objects and advantages of the present invention will become more apparent from the following detailed description when read in connection with the accompanying drawings, in which:

FIG. 1A is a front elevation illustrating an input machine as a component in a digital printing system;

FIG. 1B is an explanatory view in elevation, illustrating an output machine or printer/processor;

FIG. 3 is a table illustrating relationships of paper types represented in a data table;

FIG. 4B is a timing chart illustrating a flow of changes in the paper type and the transporting speed;

DETAILED DESCRIPTION OF THE PREFERRED EMBODIMENT(S) OF THE PRESENT INVENTION

Figure 2:
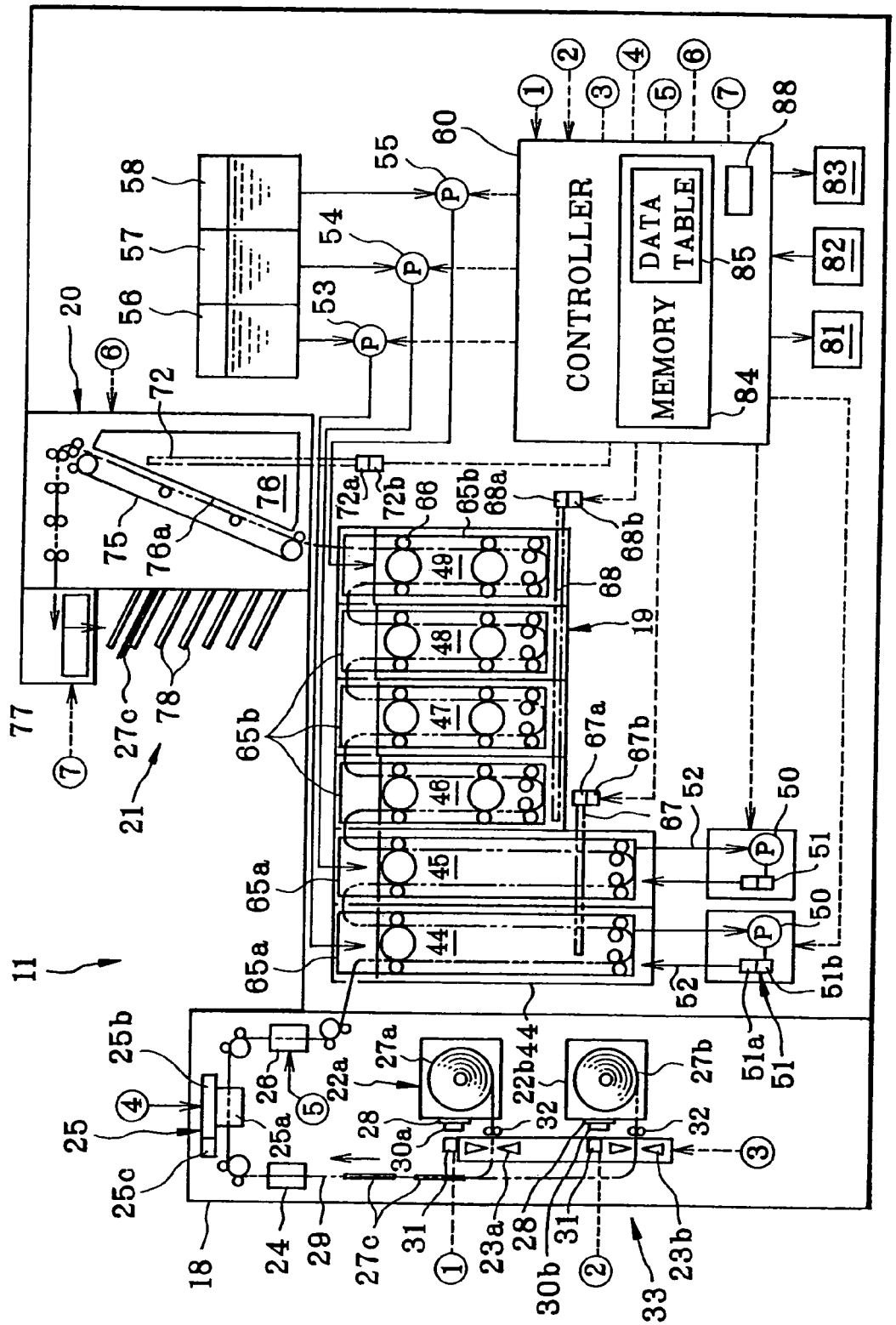
FIG. 2 is an explanatory view in elevation, illustrating the output machine particularly with relationships for control.

A photo laboratory system is a combination of an input machine 10 and an output machine 11. In FIG. 1A, the input machine 10 for a digital image is illustrated. In FIG. 1B, the output machine 11 as photosensitive material processing apparatus is illustrated. In FIG. 1A, the input machine 10 includes an image reader 14 or scanner, a monitor display panel 15, an operation panel 16 and an image data input unit 17. The image reader 14 reads an image from a photo film as digital image data, which is stored in its memory. The image of digital image data is displayed on the monitor display panel 15. An operator observes an image in the monitor display panel 15 if required, and operates the operation panel 16 having a keyboard, mouse or the like, for revising and editing the image. The image data input unit 17 retrieves image data and writes the same to a memory in the image reader 14, the image data being obtained by photographing in a video camera or digital camera, or obtained by means of the Internet, or by reading from a software disk distributed in public for storing image data.

The output machine 11 is a printer/processor constituted by a printer section 18, a processor section 19, a drier section 20, and a stacker section 21. The printer section 18 is loaded with roll magazines 22a and 22b, and includes cutters 23a and 23b, a back printing device 24, an image forming device 25, and an advancing/sorting mechanism 26.

A roll of long photographic paper 27a is contained in the roll magazine 22a. A roll of long photographic paper 27b is contained in the roll magazine 22b, and has a width different from the photographic paper 27a, or has a surface type different from that of the photographic paper 27a. The photographic paper 27a and 27b is photosensitive material. A bar code region 28 is formed on a surface of the roll magazines 22a and 22b. Bar code print sheets 30a and 30b are attached to the roll magazines 22a and 22b in the bar code region 28. The bar code print sheets 30a and 30b as type code are attached to a respective case or magazine for the photographic paper 27a and 27b, and have a printed bar code for representing the type of the photographic paper 27a and 27b. A bar code reader 31 as an input device is disposed inside the printer section 18, is opposed to the bar code region 28, and reads the bar code from the bar code print sheets 30a and 30b.

A supply roller 32 is disposed at each passage mouth of the roll magazines 22a and 22b for advancing the photographic paper 27a or 27b. The supply roller 32 is controlled according to image outputting size information received from the input machine 10, and operates at an advancing amount or cutting length determined by the size information. The photographic paper 27a or 27b being advanced is cut by one of the cutters 23a and 23b at a predetermined length, so a photographic paper sheet 27c as photosensitive sheet is obtained, and is moved past the back printing device 24. The back printing device 24 prints information to a back surface of the photographic paper sheet 27c with an ink ribbon by means of outputs of dot impact. The photographic paper sheet 27c after the back printing is transported to the image forming device 25. Note that there is a transporting path 29 through which the photographic paper sheet 27c is transported.

The image forming device 25 includes a transporting mechanism 25a, an exposure printhead 25b and an image data processor 25c. The transporting mechanism 25a transports the photographic paper sheet 27c in a sub scan direction. The exposure printhead 25b is controlled in synchronism with transport of the transporting mechanism 25a, and applies laser light to the photographic paper sheet 27c for line-shaped exposure in a main scan direction. The transporting mechanism 25a includes a pair of transporting rollers, between which an exposure position is disposed, and which transport the photographic paper sheet 27c.

The image data processor 25c is supplied with image data by the input machine 10 or other devices. The image data processor 25c subjects the image data to a prescribed data processing, for example calibration processing by means of a calibration table. According to the processed image data, a light beam is modulated by a modulator in the exposure printhead 25b, and is applied to the photographic paper sheet 27c for an exposure. Therefore, an image is recorded to the photographic paper sheet 27c as a latent image according to the image data. A plurality of exposed photographic paper sheets 27c are sorted into two trains by the advancing/sorting mechanism 26, and are transported to the processor section 19 in an orientation with its emulsion surface directed up.

The processor section 19 is constituted by a color developing bath 44, a bleach/fixing bath 45, and first, second, third and fourth rinsing baths 46, 47, 48 and 49.

In FIG. 2, a circulating pump 50 and a temperature adjustor 51 are associated with each of the color developing bath 44 and the bleach/fixing bath 45. The circulating pump 50 circulates and agitates the liquid in the color developing bath 44 and the bleach/fixing bath 45. The temperature adjustor 51 includes a heater 51a and a radiator 51b, which are disposed in a circulating path 52 through which the circulating pump 50 effects the circulation, so the temperature adjustor 51 may adjust the liquid temperature. A controller 60 controls the temperature adjustor 51. Note that the radiator 51b may be omitted. For this modified structure, the temperature is lowered by natural cooling, namely, leaving the liquid to stand with time. When the temperature comes down to a reference temperature determined previously, the use of the color developing bath 44 or the bleach/fixing bath 45 are restarted.

A color developing replenisher tank 56 is connected with the color developing bath 44. A supply pump 53 between the color developing bath 44 and the color developing replenisher tank 56 causes replenisher liquid to flow into the developing liquid in the color developing bath 44. Similarly, a bleach/fixing replenisher tank 57 is connected with the bleach/fixing bath 45. A supply pump 54 between the bleach/fixing bath 45 and the bleach/fixing replenisher tank 57 causes replenisher liquid to flow into the bleach/fixing bath 45. The supply pumps 53 and 54 are regulating pumps of which a rate of a supply flow is kept constant. To change a flow rate of the replenisher, actuating time of the supply pumps 53 and 54 per unit time is changed by the controller 60.

In FIG. 2, a water tank 58 stores water for rinsing. A supply pump 55 supplies the fourth rinsing bath 49 with the water from the water tank 58. An added portion of the rinsing water overflows in a cascade manner from the fourth rinsing bath 49 to the third rinsing bath 48, from the third 48 to the second 47, and from the second 47 to the first 46, in the direction reverse to the transport of the photographic paper sheet 27c. Thus, the rinsing baths 46–49 are replenished with the rinsing water.

A transporting rack 65a is disposed in each of the color developing bath 44 and the bleach/fixing bath 45, and transports the photographic paper sheet 27c. A transporting rack 65b is disposed in each of the rinsing baths 46–49, and transports the photographic paper sheet 27c. Transporting rollers 66 are included in each of the transporting racks 65a and 65b. First and second drive shafts 67 and 68 are engaged with or connected with respectively rotational shafts of the transporting racks 65a and 65b, to rotate the transporting rollers 66.

It is intended in the embodiment to process a plurality of types of the photographic paper sheet 27c consecutively and also efficiently even though there are differences in the photographic process between those. To this end, the second drive shaft 68 for transport in the rinsing baths 46–49 is separate from the first drive shaft 67 for transport in the color developing bath 44 and the bleach/fixing bath 45. A motor 67b is used for the first drive shaft 67. A speed changing mechanism 67a is connected between those, for transmitting rotation to the first drive shaft 67. Similarly, a motor 68b is used for the second drive shaft 68. A speed changing mechanism 68a is connected between those, for transmitting rotation to the second drive shaft 68. The controller 60 controls the entire operation of the speed changing mechanisms 67a and 68a and the motors 67b and 68b.

In FIG. 1, crossover racks 70 are disposed to bridge the liquid baths 44–49. There are transporting rollers 71 in the crossover racks 70 for transferring the photographic paper sheet 27c to each downstream one of the liquid baths 45–49.

The crossover racks 70 are also connected with the first and second drive shafts 67 and 68 illustrated in FIG. 2 to cause the transporting rollers 71 to rotate.

The drier section 20 is disposed above the fourth rinsing bath 49, and dries the photographic paper sheet 27c transported from the fourth rinsing bath 49. There are squeezing rollers 74, which send the photographic paper sheet 27c to the drier section 20 in squeezing liquid out. A drier-path transporting belt 75 and a dry air circulator 76 are incorporated in the drier section 20. The drier-path transporting belt 75 has a mesh form, and extends in a direction of the transporting path. A drive shaft 72 causes the squeezing rollers 74 to rotate and the drier-path transporting belt 75 to turn. A peripheral speed of the squeezing rollers 74 and the drier-path transporting belt 75 is equal to the transporting speed for the rinsing baths 46–49, but may be different from the latter. To rotate the drive shaft 72, a motor 72b is energized. A speed changing mechanism 72a transmits rotation of the motor 72b to the drive shaft 72.

A slit-formed panel 76a is incorporated in the dry air circulator 76 as well as a heater, duct, and fan or blower. The dry air circulator 76 blows dry air from inside the slit-formed panel 76a toward the transporting path, and circulates the dry air through the duct. There is a fresh air intake port in the duct, for letting fresh air in the duct. There is a heater in the duct for heating circulated air up to a predetermined temperature. Dry air is exhausted through the slit-formed panel 76a to blow the photographic paper sheet 27c, to dry the photographic paper sheet 27c in a state pressed on the drier-path transporting belt 75. For the drier section 20, the controller 60 is used to control various parameters which include the temperature and flow rate of the dry air, and a rate of intake of the fresh air.

The stacker section 21 is disposed beside the drier section 20, and stacks the photographic paper sheet 27c in a sorted manner for customer orders after the drying operation. Sorting trays 78 are arranged in the stacker section 21, to support the sorted set of the photographic paper sheet 27c. A circulating belt (not shown) is incorporated in the stacker section 21, and adapted to fixation of the sorting trays 78 arranged at a certain interval. Also, a realigning device 77 is incorporated in the stacker section 21. The realigning device 77 aligns the plural trains of the photographic paper sheets 27c, and treats the photographic paper sheets 27c in a single path. The controller 60 is also used to control and adjust the paper transporting speed in the stacker section 21, the realigning speed in the realigning device 77, and the moving speed of the sorting trays 78.

In FIG. 2, the controller 60 is provided with a display panel 81, an operation panel 82, and an alarm device 83, and controls the relevant sections sequentially. According to the type of the photographic paper sheet 27c, the operating conditions of the printer section 18, the processor section 19, the drier section 20 and the stacker section 21 are changed, to optimize the processing in view of the specific type. A condition table memory 84 is incorporated in the controller 60. A data table 85 as a processing condition is stored in the condition table memory 84, and includes condition data which represent predetermined processing conditions of the relevant sections in association with types of the photographic paper 27a and 27b. It is possible to rewrite, or add data to, the data table 85 in a suitable manner. If new photographic paper is supplied, then a processing condition is added according to the photographic paper.

In FIG. 3, an example of the data table 85 is illustrated. The conditions for the printer section 18, the processor section 19, the drier section 20 and the stacker section 21 are predetermined for each of the types A, B and C of the photographic paper sheet 27c. When the type A is set, the conditions for the sections 18–21 are read regarding the type A. A print is produced according to the setting of the sections 18–21 in the determined conditions.

The type A is a widely used type of the photographic paper sheet 27c. The type B has an emulsion layer with a smaller thickness than that of the type A, and is a rapid type because of shorter time in the processing. The type C is transparent, and is a film form for a professional use. The type C of the photographic paper sheet 27c has a transparent support of plastic material, for example polyethylene terephthalate (PET). The type C is observed by use of transmitted light because of transparency. There occurs no blur of colors in comparison with a light reflecting original. An image with high precision can be obtained. However, the emulsion layer is provided with a greater thickness. The process time for the type C is longer than that for the type A.

According to the above specifics, conditions are determined for the relevant sections. Among the conditions, the process time and the process temperature in the processor section 19 are principal parameters, and determined initially before the remaining conditions for the printer section 18, the drier section 20 and the stacker section 21 are determined in view of efficiency in the operation. In FIG. 3, a table is illustrated to indicate the determined conditions.

For printing with the photographic paper 27a of the type A, at first a transporting speed $Vp1$ and a liquid temperature $Tp1$ of the photographic paper sheet 27c are determined for the processor section 19. Also, a replenisher flow rate $Qp1$ for supply to the liquid baths 44–49 is determined under the conditions of $Vp1$ and $Tp1$ for the processor section 19. Furthermore, the conditions for the printer section 18 are determined for high efficiency according to the transporting speed $Vp1$ in the processor section 19, the conditions including a drawing speed $Vpm1$ of drawing of the photographic paper 27a from the magazine, a cutting interval $P1$ in the printer section 18, existence or lack of back printing, an exposing speed $Ve1$, a sorting speed $Vf1$, and a transporting speed $Vr1$ from the image forming device 25 toward the advancing/sorting mechanism 26.

Also, the conditions for the drier section 20 are determined for high efficiency according to the transporting speed $Vp1$ in the processor section 19, the conditions including a transporting speed $Vd1$, a drying temperature $Td1$, and an air flow rate $Qd1$. In the embodiment, the transporting speed, drying temperature and dry air flow rate are changed for the drier section 20 according to the type of the photographic paper sheet 27c. Furthermore, a flow rate of intake of fresh air may be changed for each one of the types of the photographic paper sheet 27c. Similarly, the conditions for the stacker section 21 are determined, including a transporting speed $Vs1$ of the stacker section 21, a realigning speed $Vm1$ for aligning and joining the plural trains of the photographic paper sheets 27c, and a tray moving speed $Vb1$ of the sorting trays 78. In the embodiment, a plurality of the processing conditions are changed. However, it is unnecessary to change all of the plural processing conditions. At least one of the processing conditions may be changed. It is possible to vary the conditioned setting with a higher degree of freedom if the number of the changeable conditions is higher.

Similarly, the sections 18–21 in combination with the type B of the photographic paper sheet 27c are conditioned. At first, the transporting speed $Vp2$, the liquid temperature $Tp2$, and the replenisher flow rate $Qp2$ are determined in relation to the processor section 19. Those values satisfy $Vp2>Vp1$, $Tp2 \geq Tp1$, and $Qp2 \geq Qp1$. According to those, the remaining conditions for the relevant sections are determined as illustrated in FIG. 3, including $P2$, $Vpm2$, existence of back printing, $Vr2$, $Ve2$, $Vf2$, $Vd2$, $Td2$, $Qd2$, $Vs2$, $Vm2$, and $Vb2$. Those values satisfy $P2 \leq P1$, $Vpm2 \geq Vpm1$, $Vr2 \geq Vr1$, $Ve2 \geq Ve1$, $Vf2 \geq Vf1$, $Vd2 > Vd1$, $Td2 \geq Td1$, $Qd2 \geq Qd1$, $Vs2 > Vs1$, $Vm2 \geq Vm1$, and $Vb2 \geq Vb1$. Also, the sections 18–21 in combination with the type C of the photographic paper sheet 27c are conditioned.

It is necessary quickly to set the condition suitable for the photographic process if continuous operation is desired by means of changing over the process between the types A, B and C for which the process time is different. If the liquid temperature is changed, considerable time for the change is required and results in unsuitability for continuous operation. In the present embodiment, only the transporting speed is changed for the purpose of shortening the time for changing over.

In the output machine 11, the process time is well-balanced among the printer section 18, the processor section 19, the drier section 20 and the stacker section 21. However, the principal one of the parameters is the photographic process time associated with the processor section 19. The performance or capability of the printer section 18, the drier section 20 and the stacker section 21 is determined according to the photographic process time, to result in sufficiently short process times.

There is a difficulty in continuous processing of two or more types of the photographic paper sheet 27c different in the photographic process. According to the processor section of the prior art, only one common transporting speed is used for the liquid baths for the photographic paper sheet 27c. It is necessary to set a new transporting speed for a succeeding photographic paper sheet 27c after exiting of the entirety of the first photographic paper sheet 27c from the liquid baths because of the difference in the photographic process. It is impossible to introduce the succeeding paper sheet or to change the transporting speed until the entire ejection of the first. This will cause a long time required for processing.

In the present embodiment, the photographic process time for the types A, B and C in the processor section 19 is respectively 180 seconds, 144 seconds, and 450 seconds. The steps for the purpose of changing over between the types A, B and C of the photographic paper sheet 27c are now described. When a first type of the photographic paper preceding a second type of the photographic paper to be used moves out of the fourth rinsing bath 49 at the downstream end of the processor section 19, then new entry of the photographic paper of the first type is suppressed at an upstream end of the color developing bath 44. Then time is measured, to detect lapse of one of 180 seconds, 144 seconds and 450 seconds associated with the first type among the types A, B and C. Upon this lapse of time, the transporting speed is changed and set at a speed level for the second type. After this, the photographic paper sheet 27c of the second type is transported into the color developing bath 44. Accordingly, the time of changing over should be shorter in view of raising the efficiency in the printing, because the complete ejection of the photographic paper sheet 27c from the fourth rinsing bath 49 must be awaited.

Figure 4A:
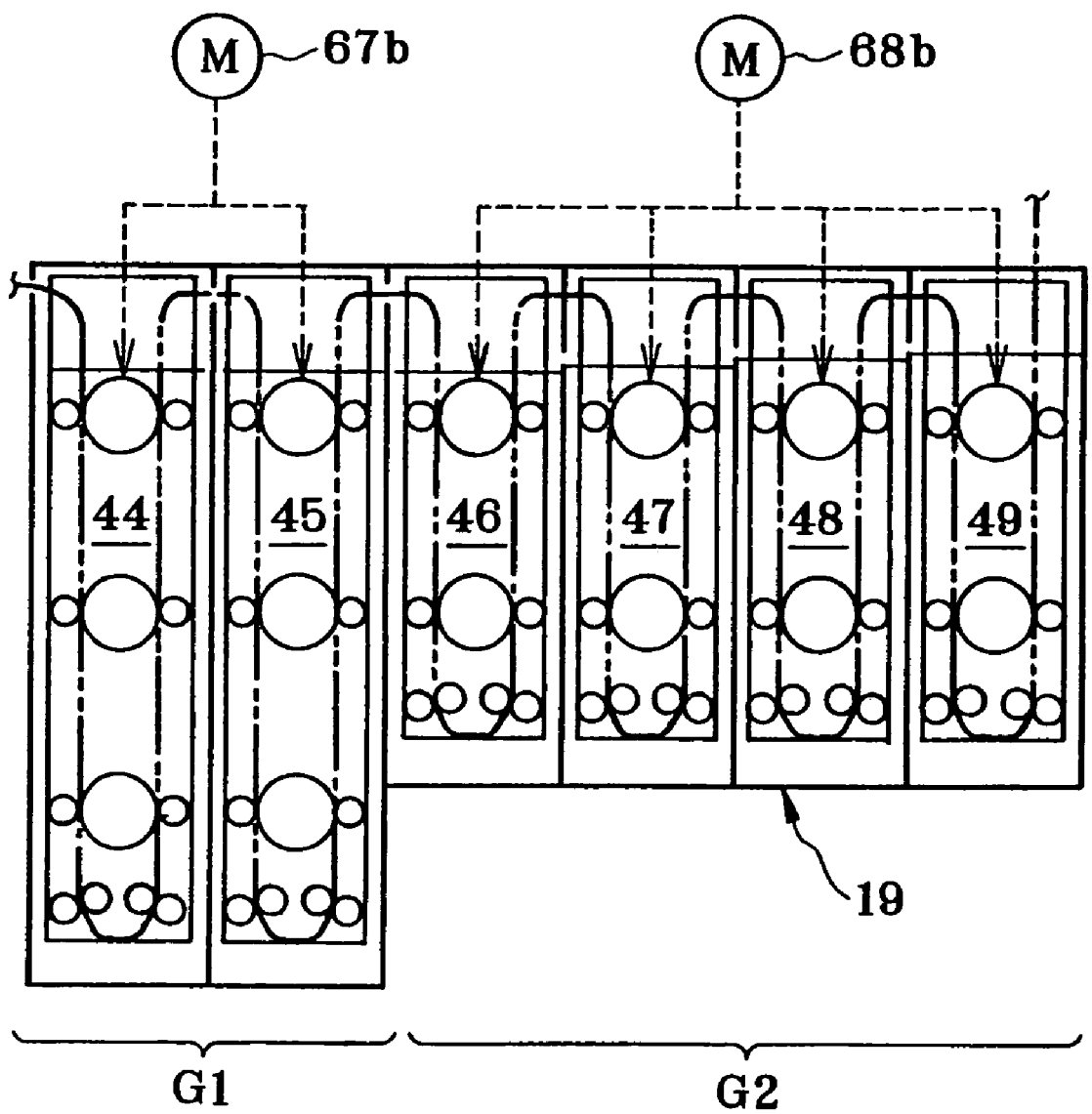
FIG. 4A is an explanatory view in elevation, illustrating two bath groups in a processor section.

According to the invention, the liquid baths 44–49 in the processor section 19 are grouped into two bath groups G1 and G2. See FIG. 4. The transporting speed of the photographic paper sheet 27c is changed for each of the bath groups G1 and G2, to shorten the time required for changing over of the types of the photographic paper sheet 27c that are different in the photographic process to be used. In the embodiment, the bath group G1 includes the color developing bath 44 and the bleach/fixing bath 45. The bath group G2 includes the rinsing baths 46–49. The motor 67b is associated only with the bath group G1. The motor 68b is associated only with the bath group G2. The motors 67b and 68b enable the separate control of the transporting speed between the groups.

A sequence of changing over of the bath groups G1 and G2 is as follows. Let VA be a transporting speed for the type A of the photographic paper sheet 27c. Let VB be a transporting speed for the type B of the photographic paper sheet 27c. VB satisfies VB>VA. Let L1 be a path length of the entire transporting path of the bath group G1. Let L2 be a path length of the entire path of the bath group G2. The path lengths according to the embodiment satisfy L1=L2. Let V1 be a transporting speed of a first photographic paper sheet 27c. Let V2 be a transporting speed of a succeeding photographic paper sheet 27c next to the first. Let ΔV be a speed difference and equal to V1−V2.

When the photographic paper sheet 27c is changed over from the type B to the type A, then ΔV=V1−V2=VB−VA is positive. The succeeding photographic paper sheet 27c will not overtake the first photographic paper sheet 27c. Immediately after the first moves to exit from the bleach/fixing bath 45 in the bath group G1, the transporting speed of the bath group G1 is changed from V1= VB to V2=VA for the color developing bath 44 and the bleach/fixing bath 45. Then the photographic paper sheet 27c of the type A is introduced to the color developing bath 44.

When the photographic paper sheet 27c is changed over from the type A to the type B, then ΔV=V1−V2=VB−VA is negative. Should the speed be changed over without a delay, the succeeding photographic paper sheet 27c of the type B will overtake the first photographic paper sheet 27c of the type A. To prevent the overtaking, calculation is conducted for obtaining delay time T (seconds) according to the equation with L1, L2, V1 and V2.

$$T=L2/V1-L1/V2$$

Then the succeeding one 27c is introduced to the color developing bath 44 upon the lapse of the delay time T. This is effective in preventing the succeeding photographic paper sheet 27c from overtaking the first photographic paper sheet 27c.

It is to be noted that the value of L2/V1−L1/V2 is a minimum required time. It is preferable that T>L2/V1−L1/V2 for the purpose of sufficiently safe operation in preventing jamming of the photographic paper sheet 27c.

Figure 5:
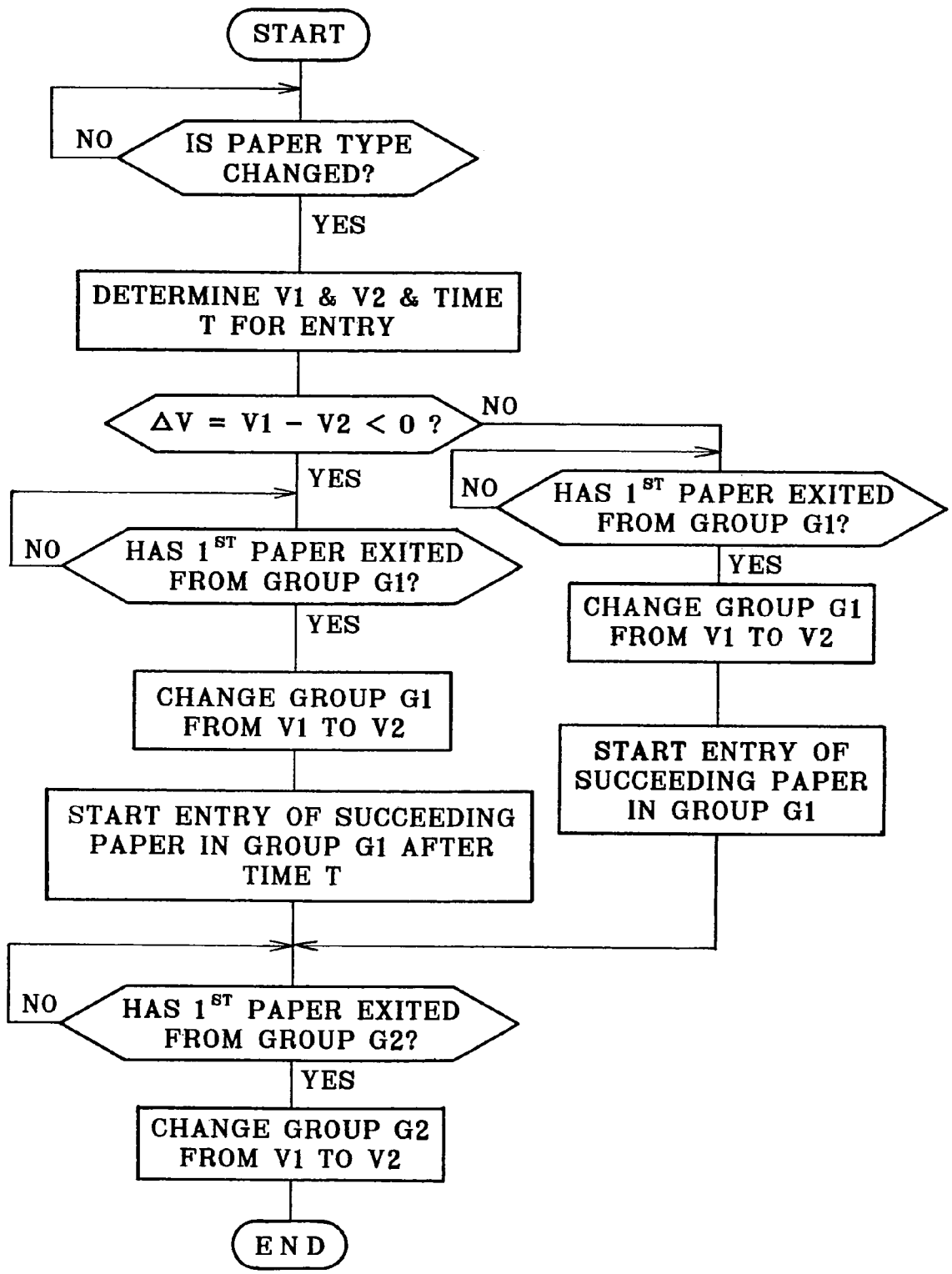
FIG. 5 is a flow chart illustrating a consecutive operation of processing two different paper types.

FIG. 5 is a flow chart illustrating changing over described above. The transporting speeds V1 and V2 are determined if there is a change in the types A and B, of which a method or process is according to the photographic process associated with the types A and B. Also, a point of time T for entry of the succeeding paper sheet 27c into the bath group G1. Upon exiting of a rear end of the first paper sheet 27c from a downstream end of the bath group G1, the transporting speed of the bath group G1 is changed over from V1 to V2. According to a positive or negative sign of the value of the speed difference ΔV, delay time T for entry of the succeeding paper sheet 27c to the bath group G1 is set at zero (0) or positive. Upon exiting of the rear end of the first paper sheet 27c from the bath group G2, the transporting speed of the bath group G2 is changed over from V1 to V2.

Figure 6:
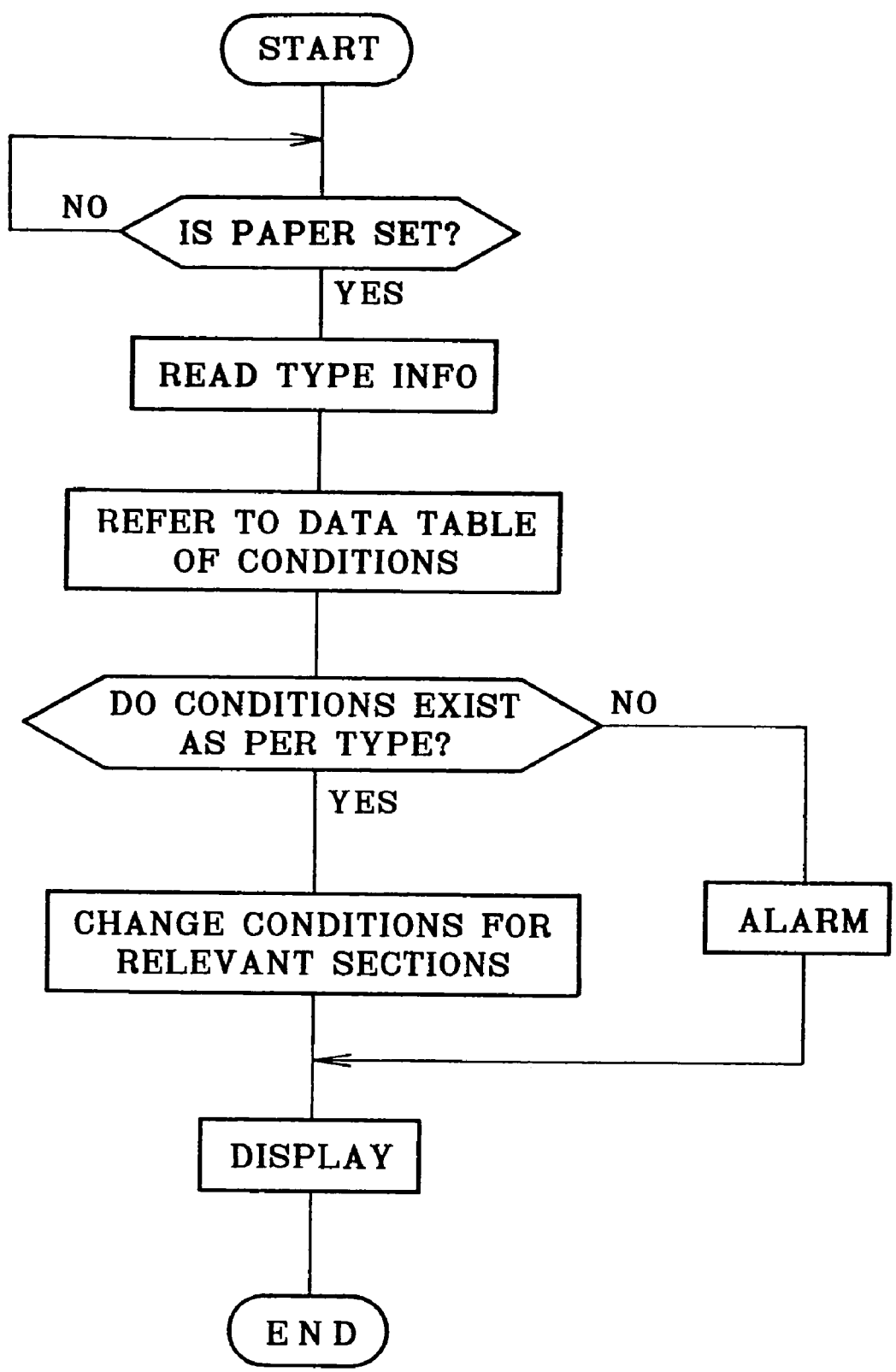
FIG. 6 is a flow chart illustrating processing of photographic paper.

The operation of the above construction is described with reference to a flow chart of FIG. 6. Among the types A, B and C, the photographic paper sheet 27c of the types A and B is set. One of the types A and B is selected at the first step for the printing. The controller 60, initially, controls reading of a bar code from the bar code print sheet 30a on the outside of the roll magazines 22a and 22b set in the printer section 18. A selection signal for one of the types A and B is entered to input a command signal for printing. According to the type A, the controller 60 refers to the table data in the condition table memory 84, and reads out the conditions associated with the type A. Thus, the relevant sections are conditioned according to the obtained conditions.

When type information of the type B is input by reading from the bar code print sheet, the controller 60 controls the various relevant sections according to the type B for printing. Thus, the relevant sections are conditioned according to the obtained conditions.

If a type of the photographic paper sheet 27c different from any of the registered types is detected, the controller 60 generates an alarm signal for impossibility of processing. The display panel 81 is caused to indicate information of an error or impossibility of processing. Also, the alarm device 83 is caused to generate an acoustic signal of alarm. Also, the controller 60 disables the printing. Even if a key, button or the like is operated for printing, there is no start of the printing. Therefore, the printing is disabled if a type different from the registered types of the photographic paper sheet 27c is set. There is no occurrence of using unacceptable types or non-genuine types supplied by third parties without being recommended by a printer manufacturer. The quality of the printing can be prevented from being lower.

If a change occurs between the types A and B of the photographic paper sheet 27c in the course of continuous processing, the transporting speed in each of the liquid baths for the photographic paper sheet 27c is changed upon movement of a front end of the succeeding photographic paper sheet 27c past an upstream end of the respective liquid bath. See FIG. 4. In the case of a change from the type A to the type B, overtaking may occur in the succeeding photographic paper sheet 27c to the first photographic paper sheet 27c, because the transporting speed for the type B or rapid type is lower than that for the type A. For this case, the transporting speed in the color developing bath 44 and the bleach/fixing bath 45 is changed over from V1 to V2 after a rear end portion of the first photographic paper sheet 27c exits from the bleach/fixing bath 45 in the bath group G1. Also, delay is provided for the operation of entry of the type B of the succeeding paper sheet 27c to the color developing bath 44 in the bath group G1.

In the case of a change from the type B to the type A, there is no overtaking of the succeeding photographic paper sheet 27c to the first photographic paper sheet 27c, because the transporting speed for the type A is lower than that for the type B. When a rear end portion of the first photographic paper sheet 27c exits from the bleach/fixing bath 45 in the bath group G1, the transporting speed is changed over from V1 to V2. Immediately after this, the succeeding photographic paper sheet 27c of the type A is introduced to the color developing bath 44 of the bath group G1.

Consequently, each of the bath groups G1 and G2, when emptied of the first photographic paper sheet 27c, is changed over to a new transporting speed of the succeeding photographic paper sheet 27c after the complete passage of the first photographic paper sheet 27c owing to the grouping construction. A delay time is provided if required for the succeeding photographic paper sheet 27c. This is effective in shortening the changing time specifically when the type of the photographic paper sheet 27c is changed over.

Figure 7:
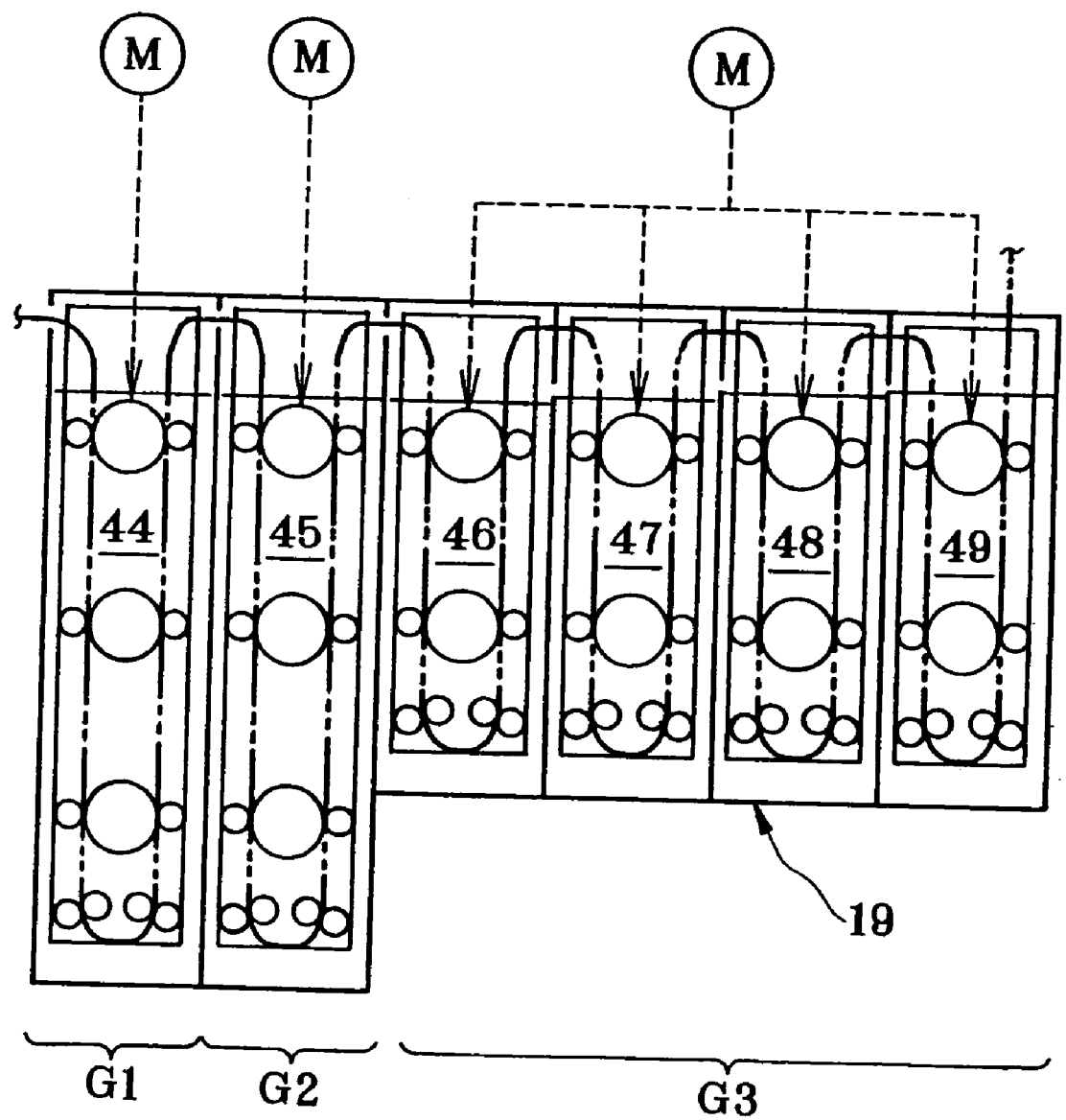
FIG. 7 is an explanatory view in elevation, illustrating one preferred embodiment having three bath groups.
Figure 8:
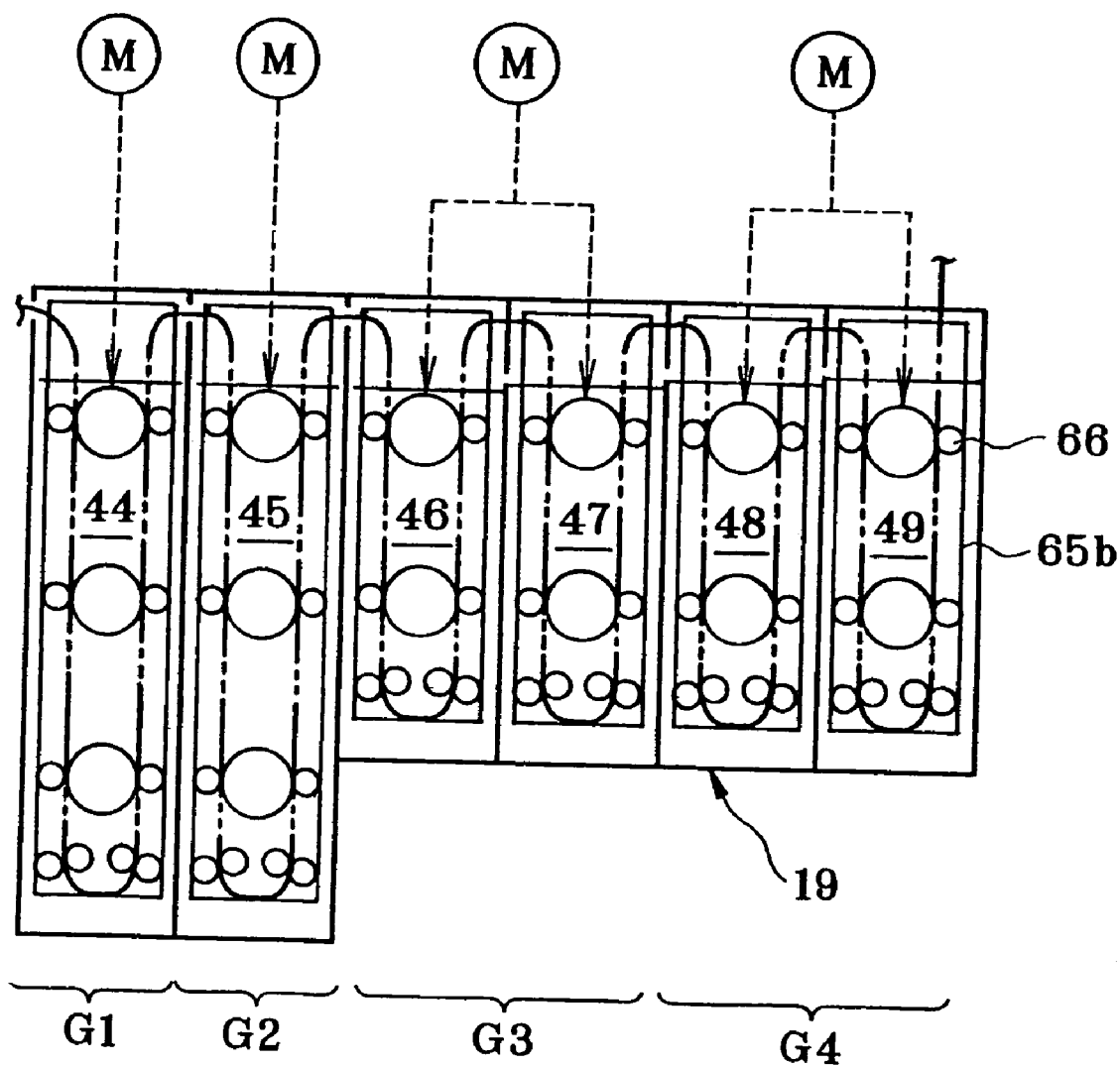
FIG. 8 is an explanatory view in elevation, illustrating another preferred embodiment having four bath groups.

Despite the two-group construction according to the above embodiment, other grouping can be used in the invention. In FIG. 7, the bath train is grouped into bath groups G1, G2 and G3, the bath group G1 having the color developing bath 44, the bath group G2 having the bleach/fixing bath 45, the bath group G3 having the rinsing baths 46–49. In FIG. 8, the bath train is grouped into bath groups G1–G4, the bath group G1 having the color developing bath 44, the bath group G2 having the bleach/fixing bath 45, the bath group G3 having the first and second rinsing baths 46 and 47, and the bath group G4 having the third and fourth rinsing baths 48 and 49. Also, the color developing bath 44 may be constituted by two subsidiary baths (not shown). The bleach/fixing bath 45 may be constituted by two subsidiary baths. According to the subsidiary baths, the color developing bath 44 may be grouped into two bath groups G1 and G2, the bleach/fixing bath 45 being grouped into two bath groups G3 and G4. As a bath group G5 can include the rinsing baths 46–49, the entirety of the bath train can be grouped into the five bath groups G1–G5. Furthermore, the rinsing baths 46–49 can be grouped into a bath group G5 with the first and second rinsing baths 46 and 47, and a bath group G6 with the third and fourth rinsing baths 48 and 49. The entirety of the bath train is grouped into the six bath groups G1–G6. The higher number of the bath groups is specifically effective in stepwise changing over of the transporting speed in the bath trains. The required time for the changing over can be shortened for the plural types of the photographic paper sheet 27c.

In the above embodiment, the bar code print sheets 30a and 30b on the roll magazines 22a and 22b are read to discern the type of the photographic paper sheet 27c automatically. However, other methods may be used for automatically discerning and inputting the type information. For example, a paper type indicia may be formed on a surface of the magazine, and may be constituted by a pattern of projections or recesses. The form or position of the paper type indicia can be prescribed for each one of the types of the photographic paper 27a. Also, if plural magazines are used in association with respectively the plural types of the photographic paper 27a and 27b, then a memory card with a paper type ID chip may be provided on each of the magazines. The memory card can be accessed for reading according to a contact type or non-contact type of reading, so as to discern the type of the photographic paper 27a and 27b. The photographic paper 27a includes a front end, is provided with a leader sheet, and is wound about a spool. The memory card may be attached to or incorporated in any one of the front end, the leader sheet and the spool. Also, the type information may be printed on a back surface of the front end of the photographic paper 27a, or on the spool, in any one of forms of the paper type indicia, paper type number, the type bar code, letters, image or the like, that is readable by means of a suitable information reader. Also, the type information may not be input automatically. Instead, an operator may manually input the type information. To this end, he or she can operate a keyboard, mouse, panel, or other operation devices for determining the type information.

It is to be noted that the passage information or exiting information of the photographic paper sheet 27c of the type A can be obtained in the following process. At first, a timer 88 of FIG. 2 is used to measure elapsed time. The controller 60 takes into consideration the speed V1, the elapsed time, and the path lengths L1 and L2 of the bath groups G1 and G2, and effects calculation to obtain estimated passage time at which the photographic paper sheet 27c of the type A is exited from each of the bath groups G1 and G2. Therefore, the passage time can be used as it constitutes the ejecting information.

Furthermore, it is possible to dispose a recording sheet passage sensor at a downstream end of each bath group, for detecting a recording sheet rear end. Alternatively, a torquemeter can be used for measuring torque applied to the transporting rollers for the transport. If it is detected that an abrupt drop occurs in the measured torque, the recording sheet rear end can be determined to have moved past the bath group.

In the above embodiment, the transporting speed is changed over according to the time of passage of the photographic paper sheet 27c through the liquid baths 44–49. However, a combination of an output of a jam sensor and the reference time can be used as a basis of changing over the transporting speed. The reference time is predetermined as time required for the passage. This modification is effective if it occurs that the photographic paper sheet 27c accidentally remains in one of the liquid baths 44–49 due to a jam or slip even after lapse of the reference time. Note that an example of the jam sensor is a recording sheet passage sensor or photosensitive material sensor, disposed in the vicinity of the transporting racks or the transporting rollers. Passage of the photographic paper sheet 27c is detected according to a signal of the recording sheet passage sensor. If the passage is not completed even at a lapse of the reference time, then it is detected that jamming has occurred.

Furthermore, it is preferable that the photographic paper sheet 27c is tracked in each of the liquid baths 44–49. A tracking signal is generated. In response to this, a change from the existence to the lack of the photographic paper sheet 27c is detected in each of the liquid baths 44–49. Then the transporting speed of the photographic paper sheet 27c can be changed over. An example of the tracking sensor is a recording sheet passage sensor which is disposed in the vicinity of the transporting racks or the transporting rollers, and which may be a photoelectric sensor. A passage of the photographic paper sheet 27c is detected in response to a signal of a detection signal from the tracking sensor. A sorting signal of the photographic paper sheet 27c generated at the advancing/sorting mechanism 26 can also be used for tracking in combination with the detection signal.

In the above embodiment, a recording material processing apparatus of the invention is a photographic paper processing apparatus. A recording material to be processed in the invention is photographic paper. However, an image forming or processing according to the invention may be other type. An apparatus of the invention should include liquid baths which are arranged in the transporting direction for passing recording material.

For example, recording material according to the invention may be photographic film which has photosensitivity. For use with this, a recording material processing apparatus may be photographic film processor. Furthermore, the recording material is sheet-shaped, but may have a long form of a strip or the like.

Figure 9:
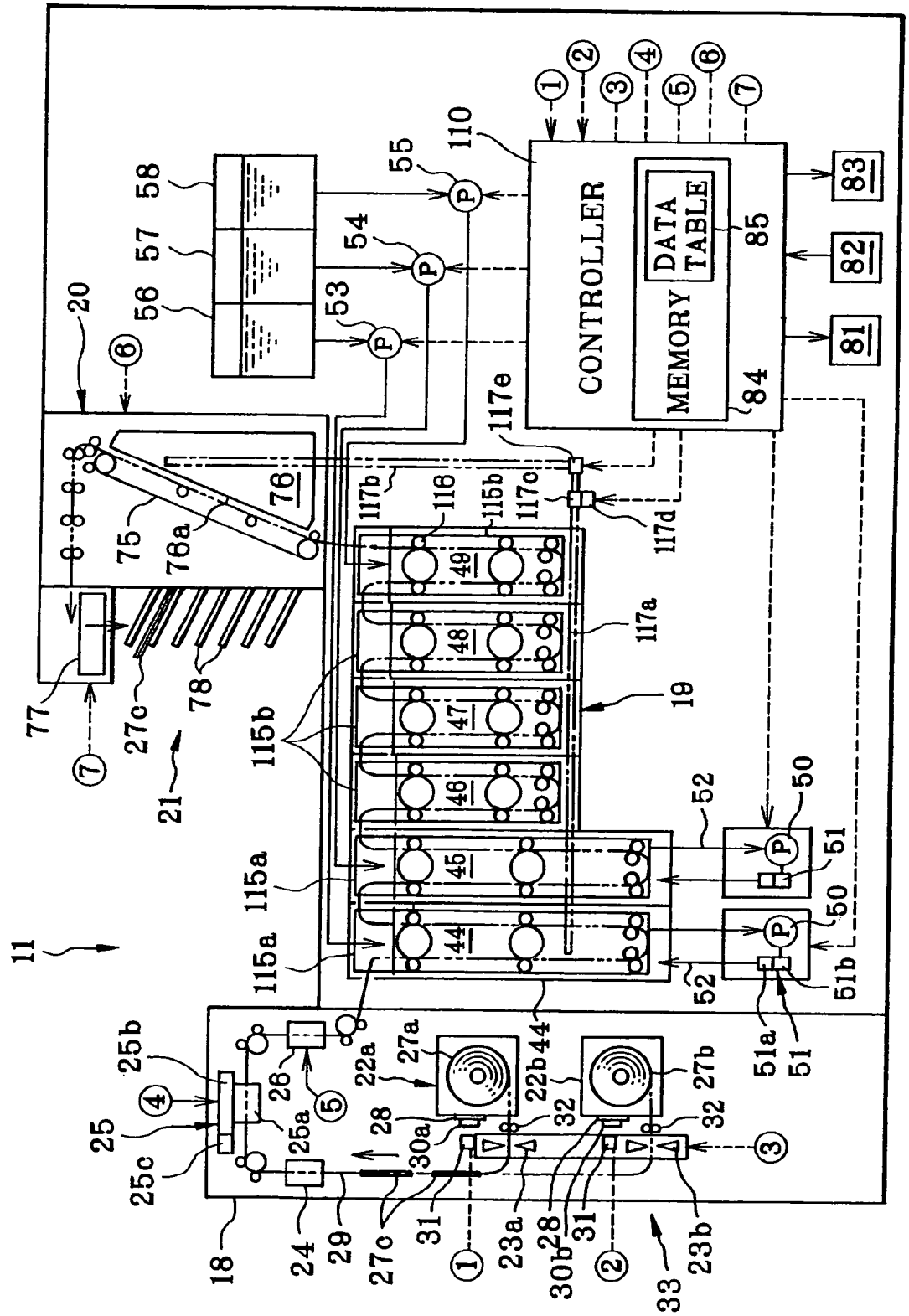
FIG. 9 is an explanatory view in elevation, illustrating a preferred structure for the control in an output machine.
Figure 10:
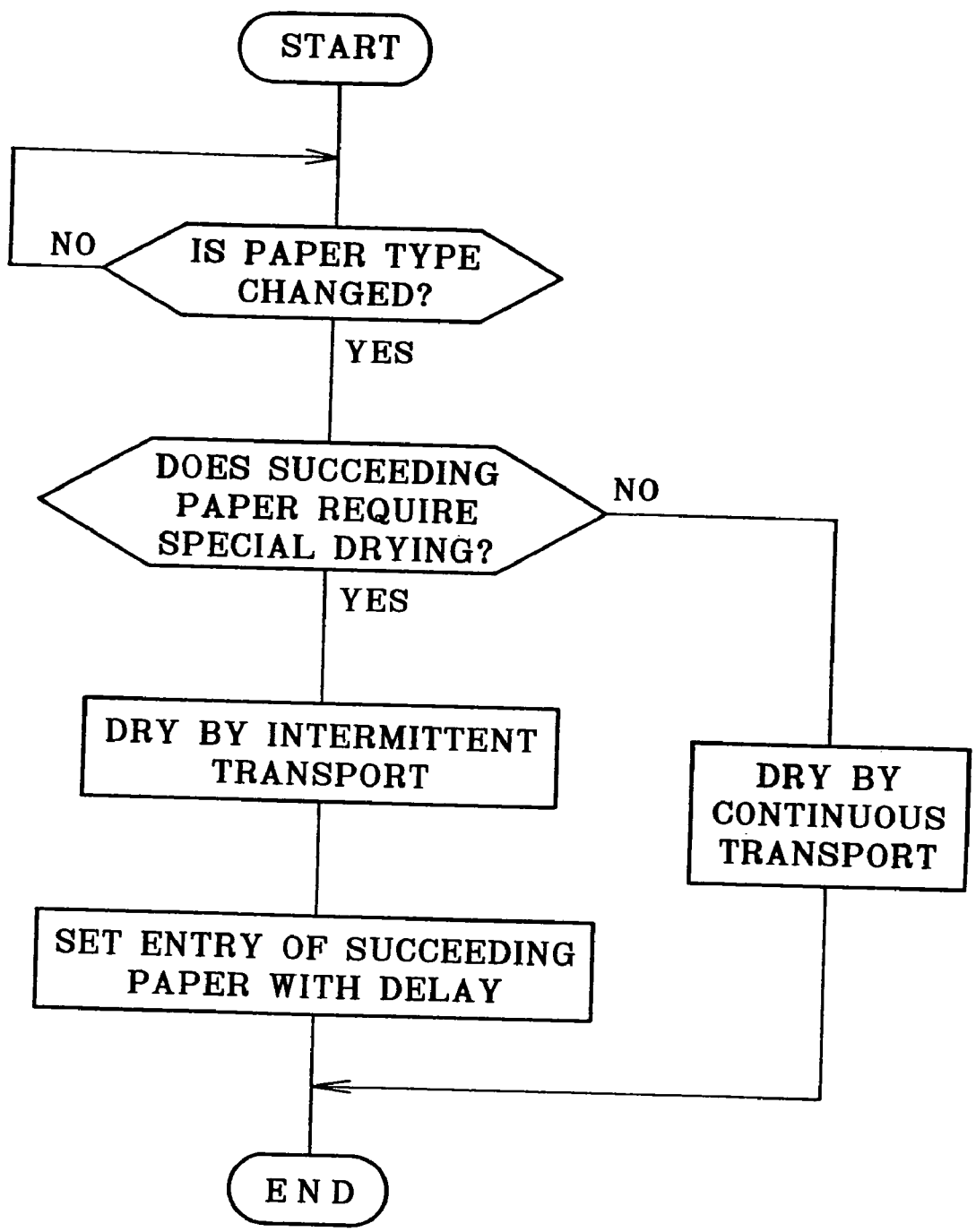
FIG. 10 is a flow chart illustrating one preferred operation of special drying of photographic paper.

In FIGS. 9 and 10, one preferred embodiment is illustrated, in which a transporting speed in a drier section can be controlled in a separate manner from the preceding liquid baths. Elements similar to those according to the above embodiments are designated with identical reference numerals. In FIG. 9, transporting racks 115a are associated with respectively the color developing bath 44 and the bleach/fixing bath 45, and transport the photographic paper sheet 27c. Transporting racks 115b are associated with respectively the rinsing baths 46–49. A number of transporting rollers 116 are included in the transporting racks 115a and 115*b*. A drive shaft 117*a* for transport is connected with the transporting racks 115*a* and 115*b*, and causes the transporting rollers 116 to rotate.

A speed changing mechanism 117*c* is used for speed reduction in rotating the drive shaft 117*a* and a drive shaft 117*b* for transport. A motor 117*d* is connected with the speed changing mechanism 117*c*, and causes those shafts to rotate. A clutch brake mechanism 117*e* is connected between the drive shaft 117*b* and the speed changing mechanism 117*c*. The clutch brake mechanism 117*e*, when in a normal state, is set in a connecting state, for transmitting rotation of the speed changing mechanism 117*c* to the drive shaft 117*b*. When the clutch brake mechanism 117*e* is disposed upon generating of a control signal, the transmission of rotation at the speed changing mechanism 117*c* is discontinued, to stop the drive shaft 117*b* from rotating. Upon the stop, the photographic paper sheet 27*c* is kept positioned in a temporary manner in the drier section for drying. This process of stationary drying is effective in reliably drying the professional-use type of the photographic paper which would be insufficient in being dried. Note that a controller 110 is connected for controlling the motor 117*d* and the clutch brake mechanism 117*e*.

Among the types A, B and C of the photographic paper sheet 27*c*, the type C is specifically referred to. The type C has a support formed from synthetic polymer film, for example polyethylene terephthalate (PET), triacetyl cellulose (TAC) or the like. The drier section 20 is conditioned for drying according to the material for the support of the photographic paper sheet 27*c*. There are great difference in handling between the type C and water proof (WP) paper, which includes a support of ordinary paper, and a polyethylene (PE) layer as a water-impermeable layer. The type C requires drying at a low temperature in view of its small resistance to heat, and for a long drying time because of its greater thickness of photosensitive layers. The required drying time for the type C is longer than drying time for the other types. The photosensitive material is stopped in the drier section, or moved at a very low speed, for the purpose of enabling drying even at a low temperature.

It is possible-with the types A and B to transport the photographic paper sheet 27*c* from the processor section 19 to the drier section 20 without changes in the speed between the processor section 19 and the drier section 20. However, drying process time TC2 for the type C must be longer than photographic process time TC1. For this type, the clutch brake mechanism 117*e* is operated to stop the transport of the photographic paper sheet 27*c*, so as to prolong the time for the photographic paper sheet 27*c* to be dried. Furthermore, if a succeeding paper sheet to enter is the type C differently from the first paper sheet, then entry of the photographic paper sheet 27*c* to the processor section 19 is effective with a delay for obtaining the sufficient drying process time TC2. For a flow of this process, see FIG. 10.

If the type C is selected in the machine loaded with only the types A and B, then an alarm signal for encouraging loading the type C is generated. When a magazine with the type C is loaded, conditions for the type C are searched and referred to, and retrieved as data. According to the retrieved conditions, the relevant elements are set, for operation of a photographic process. In the drier section 20, the clutch brake mechanism 117*e* is turned on and off intermittently, to transport the photographic paper sheet 27*c* intermittently, to ensure necessary time for a drying process.

Figure 11:
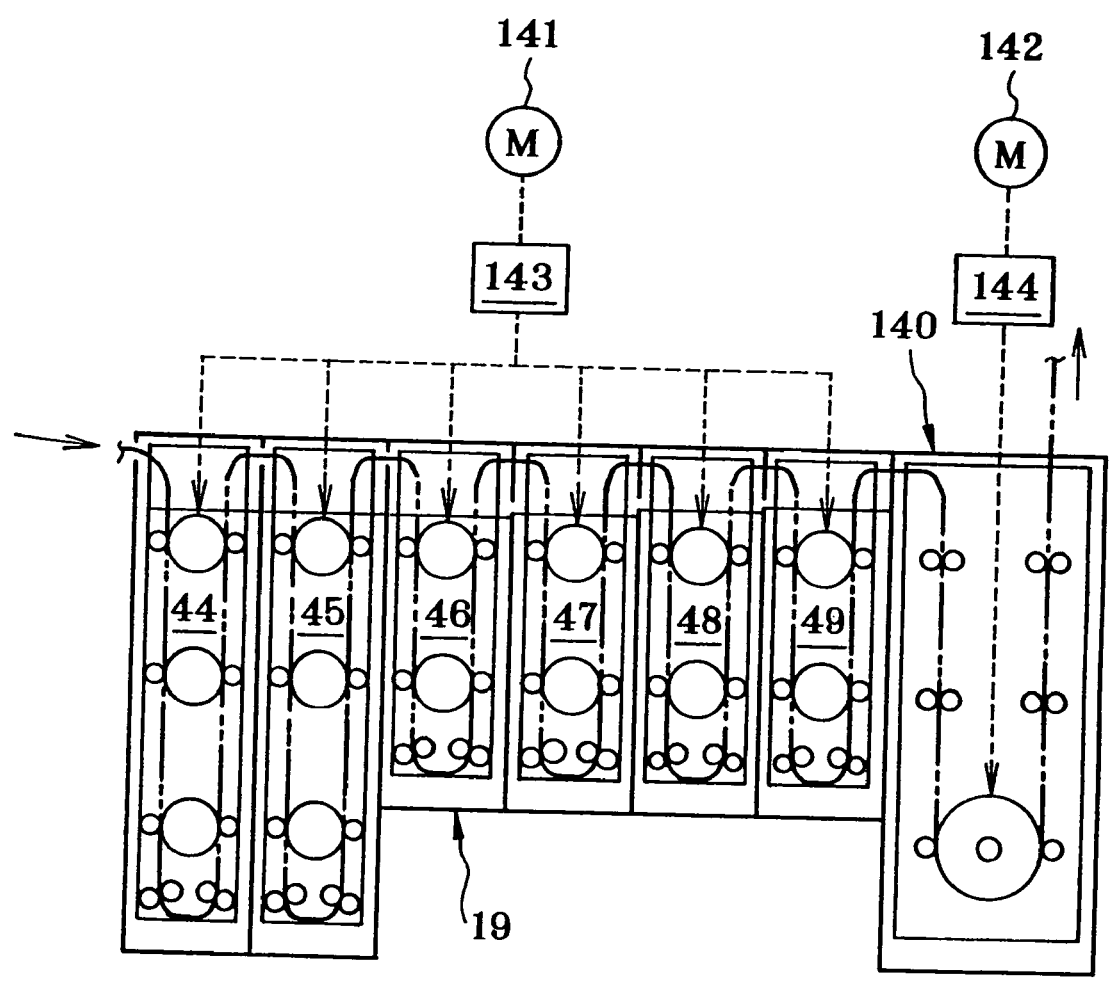
FIG. 11 is an explanatory view in elevation, illustrating another preferred embodiment.

In FIG. 11, another preferred embodiment is illustrated. There is a drier section 140 positioned downstream from the processor section 19. A motor 141 is used for the transport in the processor section 19. There is a speed changing mechanism 143 connected with the motor 141 for speed reduction in the processor section 19. A motor 142 separate from the motor 141 is used for transport in the drier section 140. There is a speed changing mechanism 144 connected with the motor 142 for speed reduction in the drier section 140. In place of the use of the clutch brake mechanism 117*e* according to the above embodiment, the double use of the motors 141 and 142 herein is effective in individual driving between the processor section 19 and the drier section 140.

Figure 12:
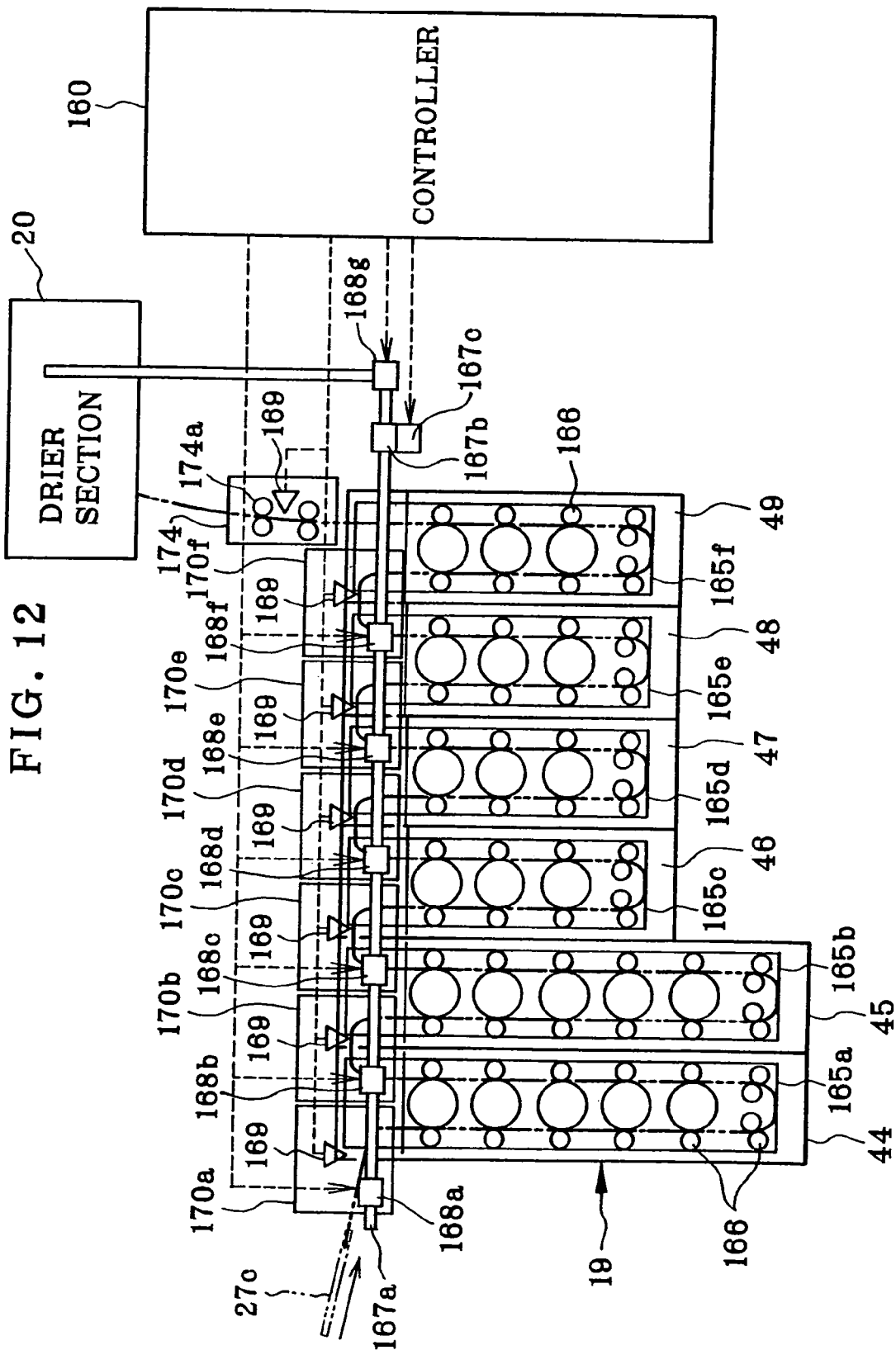
FIG. 12 is an explanatory view in elevation, illustrating a individually driving structure separate between liquid baths and the drier section.

In FIG. 12, still another preferred embodiment is illustrated. A transporting rack 165*a* is disposed in the color developing bath 44. A transporting rack 165*b* is disposed in the bleach/fixing bath 45. Transporting racks 165*c*–165*f* are disposed in respectively the rinsing baths 46–49. Those are driven to transport the photographic paper sheet 27*c*. A number of transporting rollers 166 are included in the transporting racks 165*a*–165*f*. A drive shaft 167*a* for transport is connected with shafts for driving in the transporting racks 165*a*–165*f*. A speed changing mechanism 167*b* is used for speed reduction in each of the transporting racks 165*a*–165*f*. A motor 167*c* causes the speed changing mechanism 167*b* to rotate the drive shaft 167*a*, so as to rotate the transporting rollers 166.

Clutch brake mechanisms 168*a*–168*g* are located on the drive shaft 167*a*, transmit rotation of the drive shaft 167*a* to the transporting racks 165*a*–165*f*, and also disconnect the drive shaft 167*a* from the transporting racks 165*a*–165*f* when shifted for each one of the liquid baths 44–49 and the drier section 20. The clutch brake mechanisms 168*a*–168*g* are operated intermittently, to lengthen or shorten the time of stay of the photographic paper sheet 27*c* in the liquid baths 44–49 and the drier section 20. This is effective in optimizing the conditions for the photographic development and drying. There is a controller 160 for controlling the motor 167*c* and the clutch brake mechanisms 168*a*–168*g*.

There are crossover racks 170*a*–170*f* and a squeezing roller set 174 disposed to bridge the liquid baths 44–49. A number of transporting rollers are included in the crossover racks 170*a*–170*f*, and transfer the photographic paper sheet 27*c* to adjacent liquid baths. Also in the crossover racks 170*a*–170*f*, transporting rollers are rotated by rotation of the drive shaft 167*a*. For the transmission of the rotation, the clutch brake mechanisms 168*a*–168*f* in the connected state are used. Recording sheet passage sensors 169 are disposed at respectively the crossover racks 170*a*–170*f* and the squeezing roller set 174 for detecting the photographic paper sheet 27*c*. Detection signals are output by the recording sheet passage sensors 169, and sent to the controller 160.

The drier section 20 is disposed downstream from and higher than the fourth rinsing bath 49 for drying the photographic paper sheet 27*c* from the fourth rinsing bath 49. Squeezing rollers 174*a* are included in the squeezing roller set 174, and introduce the photographic paper sheet 27*c* into the drier section 20. A drier-path transporting belt and a dry air circulator are incorporated in the drier section 20. The drier-path transporting belt has a mesh form, and extends in a direction of the transporting path. The squeezing rollers 174*a* and the drier-path transporting belt are caused to rotate or turn by the combination of the drive shaft 167*a* and the clutch brake mechanism 168*g*. The photographic paper sheet 27*c* is transported at the transporting speed equal to that in the rinsing baths 46–49.

In a normal state, the clutch brake mechanisms 168*a*–168*g* stand connected. The speed changing mechanism 167*b* transmits rotation of the motor 167*c* to the drive shaft 167*a*. If the photographic paper 27*a* is the type A or B widely used in the art, the photographic paper sheet 27c is moved past the liquid baths 44–49 and the drier section 20 at a regular speed. If the photographic paper 27a is the type C for a special use, the clutch brake mechanisms 168a–168g are individually controlled and turned on and off, for partially disconnecting power for the motor 167c. Thus, the photographic paper sheet 27c is stopped in the liquid baths 44–49 and the drier section 20 in a temporary manner. Time of the stop of the photographic paper sheet 27c is adjusted, to optimize the process time for the type C of the photographic paper sheet 27c in the photographic process and drying.

Figure 13:
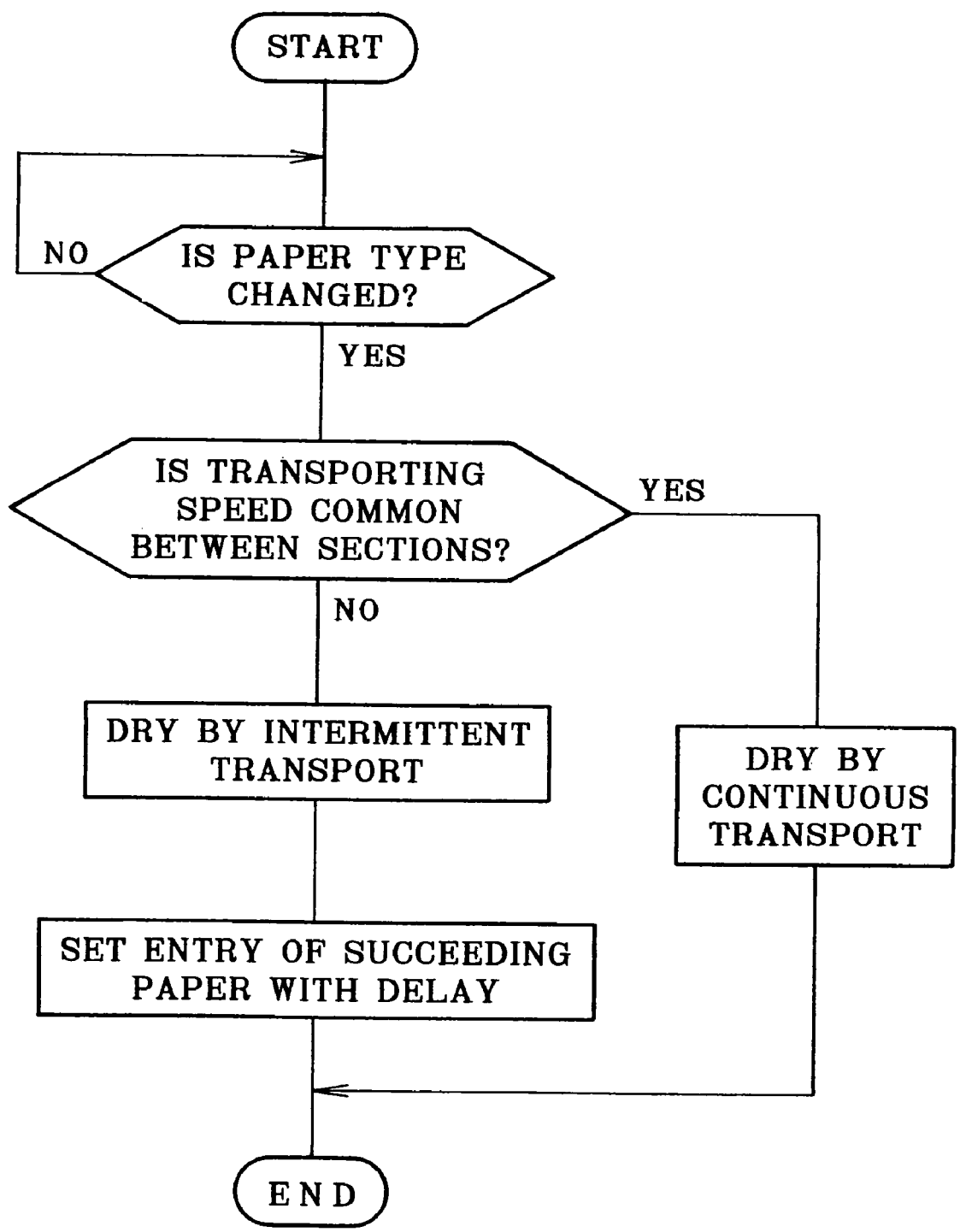
FIG. 13 is a flow chart illustrating a preferred operation of special drying of photographic paper.

In FIG. 13, a flow of the process of the embodiment is illustrated. If the common speed can be used between the processor section 19 and the drier section 20, for example for the types A and B, then the continuous transport is designated. If a change in the transporting speed is required between the drier section 20 and the processor section 19, for example for the type C, then a mode of intermittent transport with stop is selected for the liquid baths 44–49 and the drier section 20. In the embodiment, the motor 167c to transport the photographic paper sheet 27c is single for all the various baths and the drier. If a change in the transporting speed is desired, the clutch brake mechanisms 168a–168g are turned on or off, to interrupt rotation of the motor 167c. Thus, the time of processing the photographic paper sheet 27c in respectively the baths or drier. After this, the time of entry of the succeeding paper sheet is determined later as required, so as to prevent overtaking of the succeeding paper sheet to the first paper sheet.

It is, therefore, possible to process the special type of the photographic paper in a manner similar to the widely used type. Note that in the embodiment, too long time for the stop is harmful in obtaining good quality of an image. To avoid such a situation, the number of times of intermittent transport is raised. Also, the length of time during each stop is reduced. This is effective in suppressing occurrence of a difference of a portion of being strongly nipped by the transporting rollers 166 and a portion of not being strongly nipped by the same.

Figure 14:
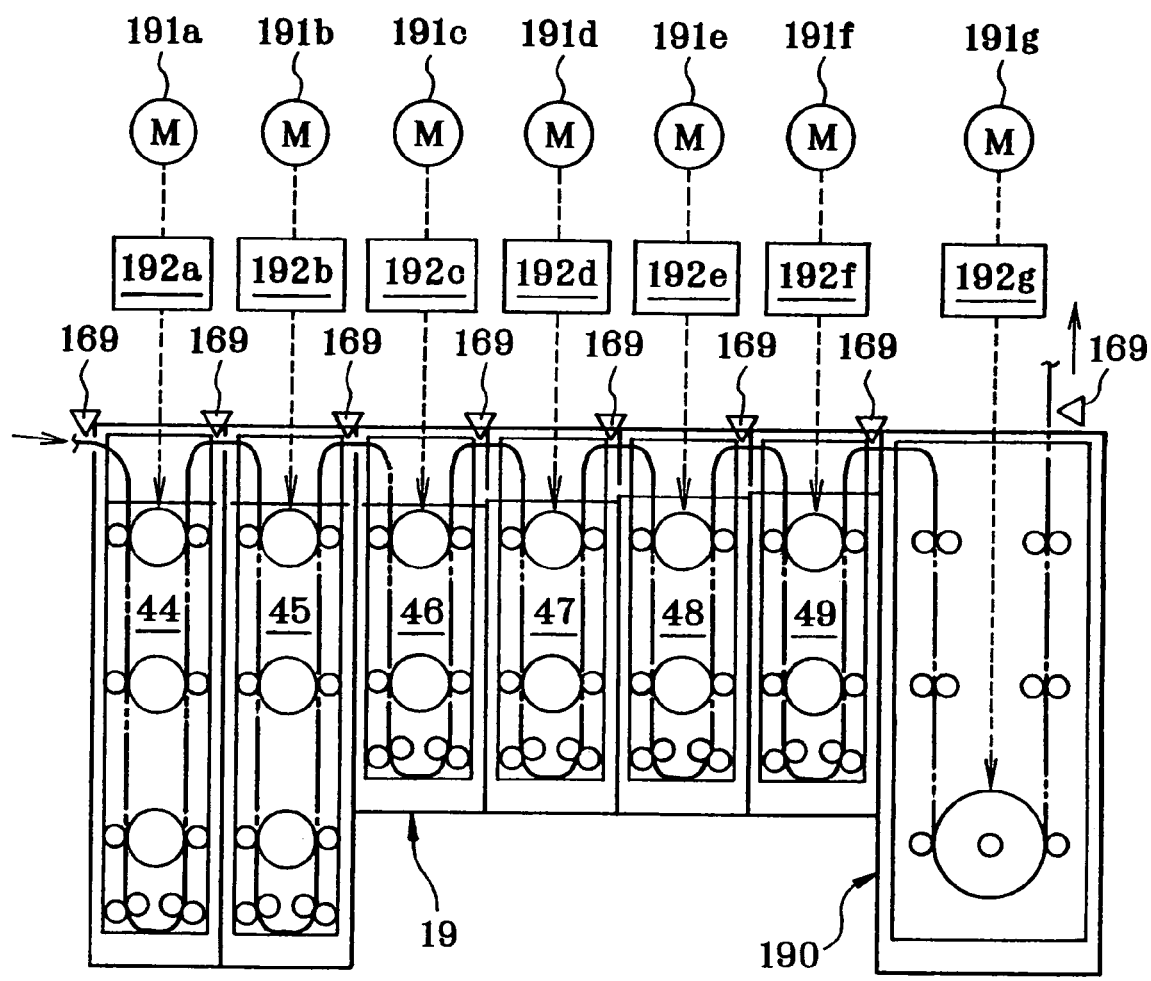
FIG. 14 is an explanatory view in elevation, illustrating a preferred embodiment.

In the above embodiment, the clutch brake mechanisms 168a–168g are associated with the drive shaft 167a in correspondence with the liquid baths 44–49 and the drier section 20. In spite of this, a structure of FIG. 14 may be used according to another preferred embodiment. There is a drier section 190 downstream from the liquid baths 44–49. A motor 191a is used for transport in the color developing bath 44. A speed changing mechanism 192a is connected with the motor 191a for speed reduction. Motors 191b–191f are used for transport in the liquid baths 45–49. Speed changing mechanism 192b–192f are connected with the motor 191b–191f for speed reduction. A motor 191g separate from the motors 191a–191f is used for transport in the drier section 190. A speed changing mechanism 192g is connected with the motor 191g for speed reduction. In place of the above use of the clutch brake mechanisms 168a–168g, the multiple use of the motors 191a–191g herein is effective in individual driving between the liquid baths 44–49 and the drier section 190. For this structure, the photographic paper sheet 27c may be transported at a very low speed in addition to, or in place of, the intermittent transport of the photographic paper sheet 27c. Also, the photographic paper sheet 27c may be transported in forward and backward directions in the vicinity of the temporary stopped position in addition to, or in place of, the intermittent transport of the photographic paper sheet 27c. The drier section can have a belt-type of transporting mechanism as illustrated in FIGS. 1 and 2, but may be the drier section 190 of a roller-type of transporting mechanism or the like as illustrated in FIG. 14. Also, it is possible to use a submerged type of transporting mechanism in the rinsing baths 46–49. According to this, resilient blades are disposed in through openings formed in partitions between the rinsing baths 46–49, in order to cause passage of the photographic paper sheet 27c and block passage of rinsing water.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A recording material processing apparatus for processing recording materials of plural types that are different in a processing condition, comprising:

plural liquid baths, arranged sequentially on a path, for processing a recording material in passing said recording material through and serially, said plural liquid baths constituting plural bath groups including a first bath group and a second bath group disposed downstream from said first bath group;

a first transporting mechanism for transporting said recording material through said first bath group;

a first driving unit for driving said first transporting mechanism at a variable transporting speed;

a second transporting mechanism for transporting said recording material through said second bath group;

a second driving unit for driving said second transporting mechanism at a variable transporting speed; and a controller for controlling said first and second driving units, and for changing said transporting speed of said first and second transporting mechanisms individually from one another according to a type of said recording material among said types;

wherein said first and second bath groups are supplied with a succeeding photosensitive material next to said photosensitive material, and when said photosensitive material exits from said first or second bath group, said controller controls said first or second driving units, and sets said transporting speed according to a processing condition of said succeeding photosensitive material before entry of said succeeding photosensitive material into said first or second bath group;

wherein said first bath group is supplied with said succeeding photosensitive material upon a lapse of delay time T after supplying said first bath group with said photosensitive material, and said delay time T satisfies a condition of:

$$T = L2/V1 - L1/V2$$

where V1 is a transporting speed of said photosensitive material,

V2 is a transporting speed of said succeeding photosensitive material, and is higher than V1, L1 is a path length of transport through said first bath group, and L2 is a path length of transport through said second bath group.

2. A recording material processing apparatus as defined in claim 1, further comprising plural sensors, associated with respectively said bath groups, for detecting passage of said photosensitive material through said bath groups;

wherein said controller is responsive to an output of respectively said sensors, and changes over one driving unit to said transporting speed according to a type of said succeeding photosensitive material, said one driving unit being among said driving units and associated with one bath group after passage of said photosensitive material among said bath groups.

3. A recording material processing apparatus as defined in claim 1, wherein said plural liquid baths include a color developing bath, a fixing bath and rinsing baths arranged in a downstream sequence, said first bath group has said color developing bath and said fixing bath, and said second bath group has said rinsing baths.

4. A recording material processing apparatus as defined in claim 1, wherein said plural bath groups further includes a third bath group, said plural liquid baths include a color developing bath, a fixing bath and rinsing baths arranged in a downstream sequence, said first bath group has said color developing bath, said second bath group has said fixing bath, and said third bath group has said rinsing baths.

5. A recording material processing apparatus as defined in claim 1, wherein said controller has a data table constituted by information of said types of said photosensitive material, and information of said transporting speed, associated with said types, for respectively said liquid baths.

6. A recording material processing apparatus as defined in claim 1, further comprising an advancing mechanism, actuated upon said lapse of said delay time T, for supplying said first bath group with said succeeding photosensitive material.

7. A recording material processing apparatus as defined in claim 6, further comprising:
a drier section positioned downstream from said second bath group;
a drier-path transporting mechanism for transporting said photosensitive material through said drier section; and
a drier-path driving unit for driving said drier-path transporting mechanism, and for changing said transporting speed of said drier-path transporting mechanism according to said type of said succeeding photosensitive material by control of said controller.

8. A recording material processing apparatus for processing recording materials of plural types that are different in a processing condition, comprising:
plural liquid baths, arranged sequentially on a path, for processing a recording material in passing said recording material through and serially, said plural liquid baths constituting plural bath groups including a first bath group and a second bath group disposed downstream from said first bath group;
a first transporting mechanism for transporting said recording material through said first bath group;
a first driving unit for driving said first transporting mechanism at a variable transporting speed;
a second transporting mechanism for transporting said recording material through said second bath group;
a second driving unit for driving said second transporting mechanism at a variable transporting speed; and
a controller for controlling said first and second driving units, and for changing said transporting speed of said first and second transporting mechanisms individually from one another according to a type of said recording material among said types;
wherein said first and second bath groups are supplied with a succeeding photosensitive material next to said photosensitive material, and when said photosensitive material exits from said first or second bath group, said controller controls said first or second driving units, and sets said transporting speed according to a processing condition of said succeeding photosensitive material before entry of said succeeding photosensitive material into said first or second bath group;
wherein said recording material is a photosensitive material in a sheet form with one size;
wherein said first bath group is supplied with said succeeding photosensitive material upon a lapse of delay time T after supplying said first bath group with said photosensitive material, and said delay time T satisfies a condition of:

$$T = L2/V1 - L1/V2$$

where V1 is a transporting speed of said photosensitive material,
V2 is a transporting speed of said succeeding photosensitive material, and is higher than V1,
L1 is a path length of transport through said first bath group, and
L2 is a path length of transport through said second bath group.

9. A recording material processing apparatus as defined in claim 8, further comprising an advancing mechanism, actuated upon said lapse of said delay time T, for supplying said first bath group with said succeeding photosensitive material.

10. A recording material processing apparatus as defined in claim 9, further comprising:
a drier section positioned downstream from said second bath group;
a drier-path transporting mechanism for transporting said photosensitive material through said drier section; and
a drier-path driving unit for driving said drier-path transporting mechanism, and for changing said transporting speed of said drier-path transporting mechanism according to said type of said succeeding photosensitive material by control of said controller.

* * * * *